(12) United States Patent
Nukuta et al.

(10) Patent No.: US 7,037,445 B2
(45) Date of Patent: May 2, 2006

(54) GREEN PHOSPHOR AND DEVICE USING THE SAME

(75) Inventors: Shinya Nukuta, Kanagawa (JP); Toshiaki Onimaru, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/386,664

(22) Filed: Mar. 13, 2003

(65) Prior Publication Data
US 2003/0173542 A1 Sep. 18, 2003

(30) Foreign Application Priority Data

Mar. 18, 2002 (JP) ............................. 2002-074423
Feb. 5, 2003 (JP) ............................. 2003-028846

(51) Int. Cl.
*C09K 11/57* (2006.01)
(52) U.S. Cl. .............................. 252/301.4 R; 313/486
(58) Field of Classification Search ......... 252/301.4 R; 313/486
See application file for complete search history.

(56) References Cited

U.S. PATENT DOCUMENTS

| 4,081,398 A | 3/1978 | Hase et al. ............... 252/301.4 |
| 4,150,321 A | 4/1979 | Schetters et al. ............ 313/486 |
| 4,216,408 A * | 8/1980 | Verstegen et al. ........... 313/468 |
| 4,606,846 A * | 8/1986 | Kahn et al. ............ 252/301.4 R |
| 5,518,808 A | 5/1996 | Bruno et al. ................. 428/323 |
| 6,210,605 B1 | 4/2001 | Srivastava et al. |
| 6,222,312 B1 | 4/2001 | Ghosh et al. ................ 313/487 |

FOREIGN PATENT DOCUMENTS

| GB | 1393040 | 5/1975 |
| JP | HEI 5-86366 | 4/1993 |

OTHER PUBLICATIONS

M.K. Cinibulk, "Hexaluminates as a Cleavalbe Fiber-Matrix Interphase: Synthesis, Texture Development, and Phase Compatibility", Journal of the European Ceramic Society, Elsevier Science Publishers, Barking, Essex, GB, vol. 20, No. 5, May 2000, pp. 569-582.

Kyong-Gue Lee, et al., "VUV Excitation and Photoluminescence Characteristics of Alumina Host Lattice Phosphors for PDP Applications", Asia Display/IDW '01, pp. 1111-1114.

* cited by examiner

*Primary Examiner*—Carol M. Koslow
(74) *Attorney, Agent, or Firm*—Staas & Halsey LLP

(57) ABSTRACT

A green phosphor having a magnetoplumbite-type crystal structure, which contains at least Mn, La and Tb, which contains at least Tb and La but does not contain Ce or which contains at least Mn, La and Zn. The green phosphor of the present invention can be used as phosphor capable of being excited by vacuum ultraviolet radiation.

10 Claims, 37 Drawing Sheets

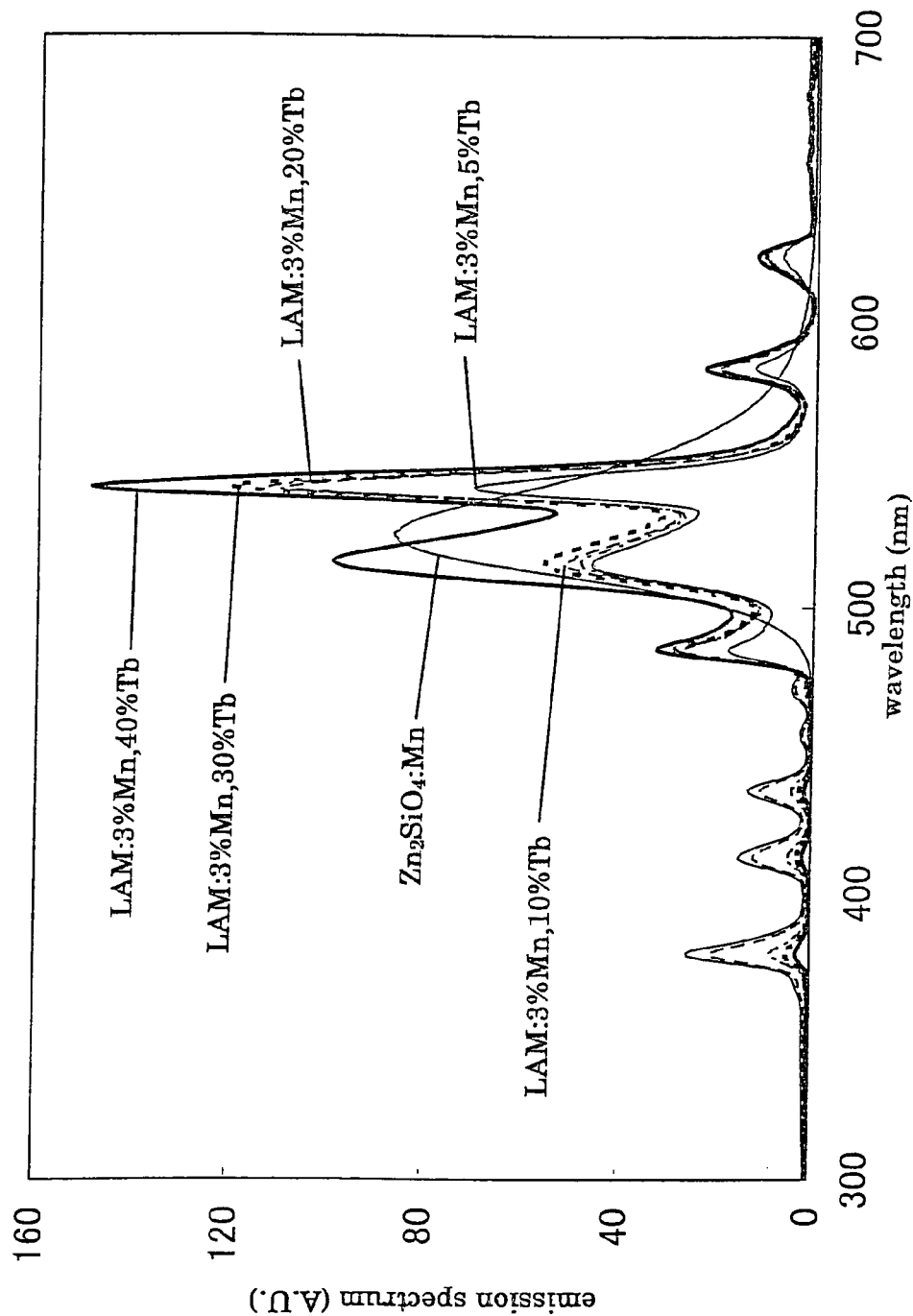

GREEN PHOSPHOR AND DEVICE USING THE SAME

CROSS-REFERENCES TO RELATED APPLICATIONS

This application is related to Japanese Patent Applications Nos. 2002-74423 and 2003-28846, filed on Mar. 18, 2002 and Feb. 5, 2003, on the basis of which priorities are claimed under 35 USC § 119, the disclosure of these applications being incorporated by reference in their entirety.

BACKGROUND OF THE INVENTION

1. Field of the Invention

The present invention relates to a green phosphor and a device using the same, more particularly to a green phosphor capable of converting received light to light of lower energy (longer wavelength) and a device using the green phosphor. The phosphor of the present invention can be suitably used for gas discharge devices such as fluorescent lamps and displays such as plasma display panels (PDPs)

2. Description of Related Art

Phosphors are used in a variety of fields. For example, phosphors are used for luminaires such as fluorescent lamps, displays such as PDPs, and X-ray camera tubes.

Of such phosphors, $Zn_2SiO_4$:Mn is well known as a green phosphor which is excited by vacuum ultraviolet radiation. This phosphor is advantageous because it has high color purity (chromaticity coordinates: (0.21, 0.72)) and a high luminous efficiency. However, its luminance changes rapidly with time and its life is short. Also, when this phosphor is excited with strong light, the luminous efficiency drops and the luminance is saturated.

$BaAl_{12}O_{19}$:Mn, which is a known green phosphor, also has high color purity and high luminous efficiency, but has a short life.

Known phosphors having improved life and luminous efficiency are crystals having a magnetoplumbite-type structure with both a rare-earth element and a transition metal added as sensitizers to their luminescence center. Particularly, $LaAl_{11}O_{18}$:$Eu^{2+}$, Mn (JJAP, 13(1974) pp. 950–956) and $SrAl_{12}O_{19}$:La, $Eu^{2+}$, Mn (Philips Technical Review, 37(1977) pp. 221–233) are mentioned as old examples. With these phosphors, green light can be obtained by first obtaining blue light by exciting $Eu^{2+}$ using suitable excitation light and exciting $Mn^{2+}$ using the blue light. The blue light hardly comes outside because most of the blue light is used for exciting $Mn^{2+}$.

In addition to the above-mentioned phosphors, $SrAl_{12}O_{19}$:Mn, Ln (Ln: a trivalent rare-earth element such as $Ce^{3+}$, $Pr^{3+}$, $Gd^{3+}$, $Tb^{3+}$) is known (U.S. Pat. No. 6,210,605). In this phosphor, energy transfers from the rare-earth element to Mn, and more green light can be obtained than a phosphor in which only Mn contributes to light emission.

$Ce^{3+}$ is well known as a sensitizer element which intensifies light emission from $Tb^{3+}$. For example, $CeMgAl_{11}O_{19}$:Tb is described in J. Luminescence, 9 (1974) pp. 415–419 and Philips Technical Review, 37(1977) pp. 221–233. In this phosphor, because the energy state of light emitted from Ce is almost equal to the energy state of f-d transition of Tb, energy transfers from Ce to Tb with high efficiency. This phosphor has a long life, but has a lower luminous efficiency than $Zn_2SiO_4$:Mn when excited by vacuum ultraviolet radiation. Further, the phosphor has low color purity (chromaticity coordinates: (0.33, 0.61)) because its emission spectrum has sub-peaks at 480 nm (blue, based on transition from $^5D_4$ to $^7F_4$), 580 nm (yellow, based on transition from $^5D_4$ to $^7F_4$) and 600 nm (red, based on transition from $^5D_4$ to $^7F_3$) in addition to a yellowish green emission line at 540 nm as a main peak (based on transition from $^5D_4$ to $^7F_5$). For this reason, this phosphor is not suitable for display devices.

A phosphor in which Tb is inserted in a borate ($YBO_3$, $LuBO_3$) containing a rare-earth element has a high luminous efficiency, but does not have good color purity, and therefore it is not suitable for display devices.

Japanese Unexamined Patent Publication No. HEI 5(1993)-86366 discloses a phosphor represented by $(Ce_{1-x}Tb_x)(Mg_{1-a-b}Zn_aMn_b)Al_{2z}O_{2.5+3z}$ (wherein $0<x\leq0.6$, $0<a+b\leq1$, $4.5\leq z\leq15$). This phosphor has a spectrum of light emitted from Tb plus light emitted from Mn having a peak wavelength 515 nm. Therefore, the chromaticity is improved as compared with the above-described phosphors. However, regarding the light emission amount upon excitation by vacuum ultraviolet radiation, the phosphor is about 20% inferior to $Zn_2SiO_4$:Mn.

SUMMARY OF THE INVENTION

The present invention provides a first green phosphor having a magnetoplumbite-type crystal structure and containing at least Mn, La and Tb.

The present invention further provides a second green phosphor having a magnetoplumbite-type crystal structure, containing at least Tb and La and not containing Ce.

The present invention also provides a third green phosphor having a magnetoplumbite-type crystal structure and containing at least Mn, La and Zn.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
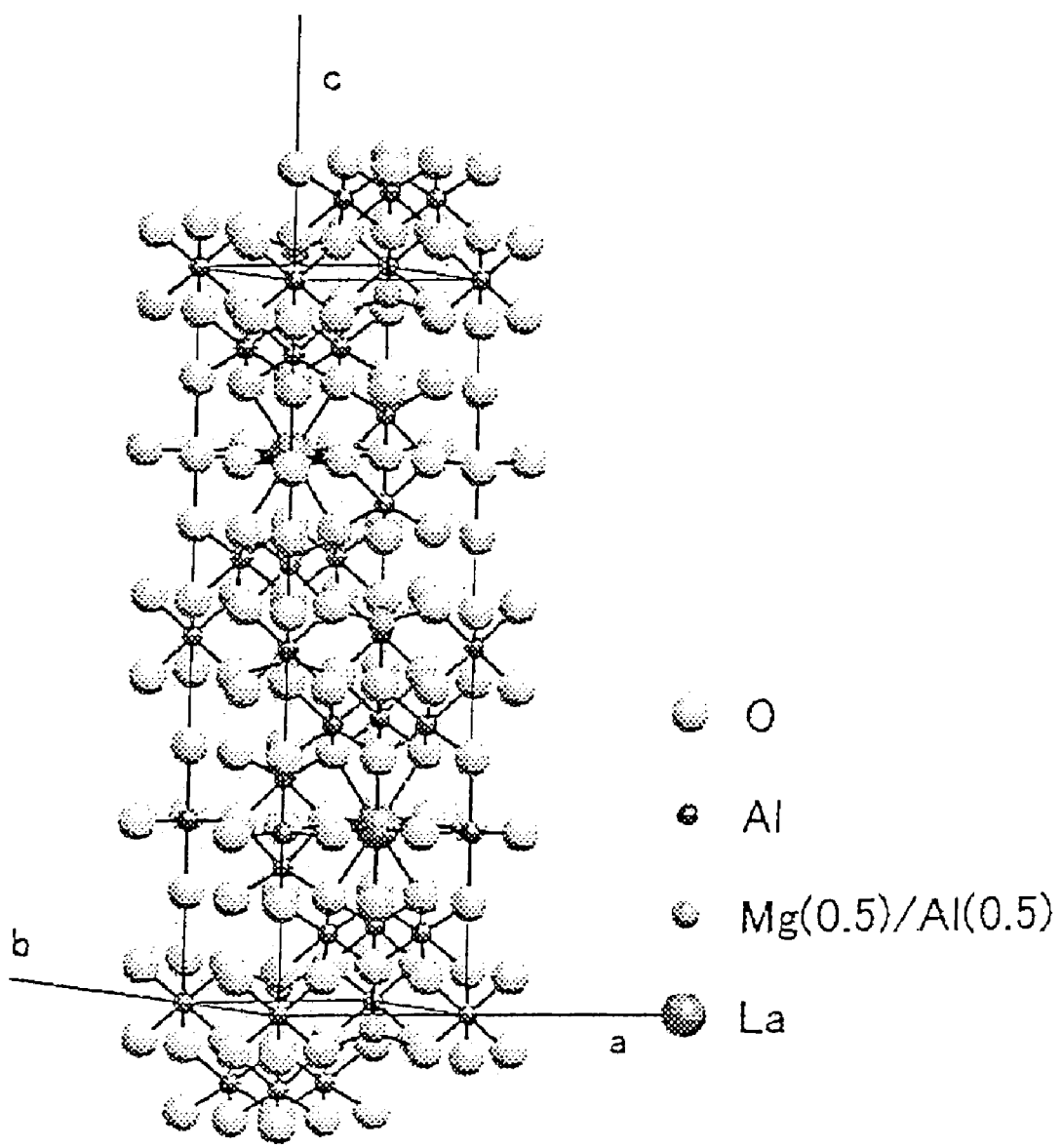
FIG. 1 is a schematic view of the crystal structure of a green phosphor in accordance with the present invention.

In the first green phosphor of the present invention, a host material having a crystal structure of magnetoplumbite type (see FIG. 1) is used. The host material contains at least La, and Tb is contained as a luminescence center element. The inventors of the present invention have found out that La has the function of converting energy such as vacuum ultraviolet radiation, which is greater than ultraviolet radiation, into energy having a peak wavelength of 350 nm (about 3.5 eV). This function is considered due to a CTS (charge transfer state) transition of La. The energy of 3.5 eV corresponds to an f-d transition energy of Tb, and therefore, it is considered that La has a sensitizing function in light emission by Tb. This CTS transition (energy transfer mechanism) takes place at about 7 eV or more. For this reason, an excitation source is not particularly limited to vacuum ultraviolet radiation, but may be an electron beam, an X-ray or the like having energy of about 7 eV or more.

In the first green phosphor, Mn is also contained as a luminescence center element. The intensity of light emission by Mn depends upon crystal field splitting of the d orbital. However, the inventors have found out that the use of Mn in the host material having the magnetoplumbite-type crystal structure allows emission of green light with high color purity. The luminous efficiency of phosphors is affected adversely by trapping of electrons and/or holes and non-radiative attenuation caused by crystal defects in its broad sense and by luminance saturation due to resonance radiation and energy transfer (energy is transferred to adjacent luminescence center elements without light emission) when the luminescence center elements are excited. Light emitted by Mn and that emitted by Tb interfere with each other only slightly, and therefore little energy transfers between Mn and Tb. Consequently, a luminance saturation characteristic can be improved as compared with the case where Mn or Tb is used separately.

Further, it has also been found out that, when Mn and Tb are used together, phosphorescence can be suppressed as compared with the case where Mn is used alone. This suppression gives a great advantage to display devices such as PDPs.

The following are examples of the first green phosphor:

First, the host material is not particularly limited provided that it contains La and has the magnetoplumbite-type crystal structure. As elements forming the host material, Mg, Al, Ca, Sr, Ce, Ba, Zn, Si, Y, B and the like may be mentioned in addition to La. More particularly, the host material may be $LaMgAl_{11}O_{19}$, $La_xAl_yO_z$ (x:y:z=0.5 to 1.2:11 to 12:18 to 19.5) or the like. Further the host material may be mixed with other host materials such as $CaAl_{12}O_{19}$, $SrAl_{12}O_{19}$ and the like in an appropriate proportion so as to form a mix crystal. By mix-crystallization, the proportion of La in the host material can be reduced, and the use amount of Tb as a luminescence center element can be reduced with reduction of La. Because Tb is an expensive material, the reduction of its use amount will reduce the costs of the green phosphor. Also since the use amount of Mn as a luminescence center element is relatively increased, the green phosphor has excellent color purity.

Luminescence center elements are not particularly limited provided that at least Tb and Mn are contained. Examples of luminescence center elements other than Tb and Mn may include Sc, Ti, V, Cr, Fe, Co, Ni, Cu, Zn, Ga, Ge, Sr, Y, Zr, Nb, Mo, Tc, Ru, Rd, Pd, Ag, Cd, In, Sn, Ba, La, Ce, Pr, Nd, Pm, Sm, Eu, Gd, Dy, Ho, Er, Tm, Yb, Lu, Hf, Ta, W, Tl, Pb, Bi and the like.

The second green phosphor has been made from the findings that the CTS transition emission of La has a greater effect in sensitizing Tb than Ce, which has been conventionally used as an element having such sensitizing effect, and therefore the use of La can improve the luminous efficiency. CTS means a state in which electrons of elements coordinated around La as a central element are excited and transferred into La. The inventors have confirmed that, when excited by vacuum ultraviolet radiation of 147 nm, $LaMgAl_{11}O_{19}$:Tb has a luminous efficiency about 20% higher than $CeMgAl_{11}O_{19}$:Tb.

In detail, $La^{3+}$ changes to $La^{2+}$ in CTS. One electron exists in the f orbital of $La^{2+}$ as in $Ce^{3+}$. The atomic number of La is 57 and that of Ce is 58, and the difference therebetween is only 2% or less. Therefore, the f-d transition of La is equivalent to that of Ce. Thus La has a sensitizing effect similar to $Ce^{3+}$ in light emission by Tb. Usually $La^{2+}$ cannot excite $La^{3+}$ in the ground state and selectively excites Tb to induce light emission. However, $Ce^{3+}$ does not excite Tb selectively. Therefore, its $La^{2+}$ has a stronger Tb sensitizing effect than $Ce^{3+}$.

The following are examples of the second green phosphor:

First, the host material is not particularly limited provided that it contains La, does not contain Ce and has the magnetoplumbite-type crystal structure. As elements forming the host material, Mg, Al, Ca, Sr, Ba, Zn, Si, Y, B, Bi and the like may be mentioned in addition to La. Particularly, the host material may be $LaMgAl_{11}O_{19}$, $La_xAl_yO_z$ (x:y:z=0.5 to 1.2:11 to 12:18 to 19.5) or the like. Further the host material may be mixed with other host materials such as $CaAl_{12}O_{19}$, $SrAl_{12}O_{19}$ and the like in an appropriate proportion so as to form a mix crystal. By mix-crystallization, the proportion of La in the host material can be reduced, and the use amount of Tb as a luminescence center element can be reduced with reduction of La. Because Tb is an expensive material, the reduction of its use amount will reduce the costs of the green phosphor. Also since the use amount of Mn as a luminescence center element is relatively increased, the green phosphor has excellent color purity.

Luminescence center elements are not particularly limited provided that Tb is contained and Ce is not contained. Other luminescence center elements than Tb may be Sc, Ti, V, Cr, Fe, Co, Ni, Cu, Zn, Ga, Ge, Sr, Y, Zr, Nb, Mo, Tc, Ru, Rd, Pd, Ag, Cd, In, Sn, Ba, La, Pr, Nd, Pm, Sm, Eu, Gd, Dy, Ho, Er, Tm, Yb, Lu, Hf, Ta, W, Tl, Pb, Bi and the like.

As a green phosphor satisfying the conditions required of the first and second green phosphors, $(La_{1-x}Tb_x)(Mg_{1-y}Mn_y)Al_{11}O_{19}$ wherein x is 0.01 to 0.6, y is 0.01 to 0.2 may be mentioned, including $(La_{0.6}Tb_{0.4})(Mg_{0.97}Mn_{0.03})Al_{11}O_{19}$ as a particular example. Also as a generally known technique regarding phosphors, the composition ratio of La, Mg, and Al may be shifted for improving luminance.

Further, the above green phosphor may be mix-crystallized with $(Ca, Sr)Al_{12}O_{19}$:Mn.

In the third green phosphor of the present invention, a host material having the magnetoplumbite type crystal structure (see FIG. 1) is used. The host material contains at least La, and Mn and Zn are contained as luminescence center elements. The principle that La sensitizes the luminescence center elements are the same as that discussed for the first and second green phosphor.

Further, the third green phosphor is based on the findings that the addition of Zn as a luminescence center element improves the light emission amount 10% or more at the maximum. The reason is considered to be that the exciton of Zn is a Wannier exciton whose orbital is not localized around Zn but widely spread in the phosphor. The exciton suppresses non-radiative attenuation of energy caused by defects or impurities in the phosphor, and therefore, the light emission amount increases.

The following are examples of the third green phosphor:

First, the host material is not particularly limited provided that it contains La and has the magnetoplumbite-type crystal structure. As elements forming the host material, Mg, Al, Ca, Sr, Ce, Ba, Zn, Si, Y, B and the like may be mentioned in addition to La. Particularly, the host material may be $LaMgAl_{11}O_{19}$, $La_xAl_yO_z$ (x:y:z=0.5 to 1.2:11 to 12:18 to 19.5) or the like. Further the host material may be mixed with other host materials such as $CaAl_{12}O_{19}$, $SrAl_{12}O_{19}$ and the like in an appropriate proportion so as to form a mix crystal. By mix-crystallization, the proportion of La in the host material can be reduced, and the use amount of the luminescence center elements can be reduced with reduction of La. The reduction of the use amount of luminescence center elements will lead to a reduction in the costs of the green phosphor.

Luminescence center elements are not particularly limited provided that at least Mn and Zn are contained. The use of Mn as a luminescent element contributes to the obtainment of a green phosphor with excellent color purity. Examples of luminescence center elements other than Mn and Zn may include Tb, Sc, Ti, V, Cr, Fe, Co, Ni, Cu, Ga, Ge, Sr, Y, Zr, Nb, Mo, Tc, Ru, Rd, Pd, Ag, Cd, In, Sn, Ba, La, Ce, Pr, Nd, Pm, Sm, Eu, Gd, Dy, Ho, Er, Tm, Yb, Lu, Hf, Ta, W, Tl, Pb, Bi and the like.

Preferably, the third green phosphor does not contain Ce and/or contains Tb among the above-mentioned luminescence center elements.

As a green phosphor satisfying the conditions required of the third green phosphor, $(La_{1-x}Tb_x)_y(Mg_{1-a-b}Mn_aZn_b)Al_zO_{1.5(y+z)+1}$ wherein $0 \leq x \leq 0.5$, $0.8 \leq y \leq 1.2$, $0 < a+b \leq 1$, $8 \leq z \leq 30$) may be mentioned. A preferable range for x is 0.1 to 0.4, a preferable range for a is 0.01 to 0.1, a preferable range for b is 0.1 or less and a more preferable range for b is 0.01 or less. Also as a generally known technique regarding phosphors, the composition ratio of La, Mg and Al may be shifted for improving luminance.

Further, the above green phosphor may be mix-crystallized with $(Ca, Sr)Al_{12}O_{19}$:Mn.

The phosphor according to the present invention may be formed by a known method. For example, compounds containing La, Tb and/or Mn and compounds containing other elements of the phosphor are weighed in molar ratios appropriate for a desired crystal structure. These compounds are sintered and the obtained sinter of the phosphor is pulverized and classified to give a phosphor having a desired particle size.

Particularly, sintering is performed at a sintering temperature of 1,300 to 1,700° C. for 1 to 10 hours in a reducing atmosphere under atmospheric pressure. For the purpose of reducing the sintering temperature, a reaction accelerator composed of a halide such as $AlF_2$, $MgF_2$, LiF, NaF or the like may be used within a range such that the reaction accelerator does not mar the effect of the invention.

In the case where the phosphor contains Zn, Zn may be evaporated if the material for the phosphor is sintered at 900° C. or higher in a reducing atmosphere. Therefore, the material is preferably sintered in a nitrogen atmosphere. For preventing Zn from evaporating, it is preferable that the sintering temperature is 1,400° C. or lower.

The phosphors of the present invention may be used for luminaires such as fluorescent lamps, display devices such as PDPs, CRTs, fluorescent display tubes and X-ray camera tubes and the like. In the following examples, phosphors according to the present invention are applied to a PDP shown in FIG. 2.

Figure 2:
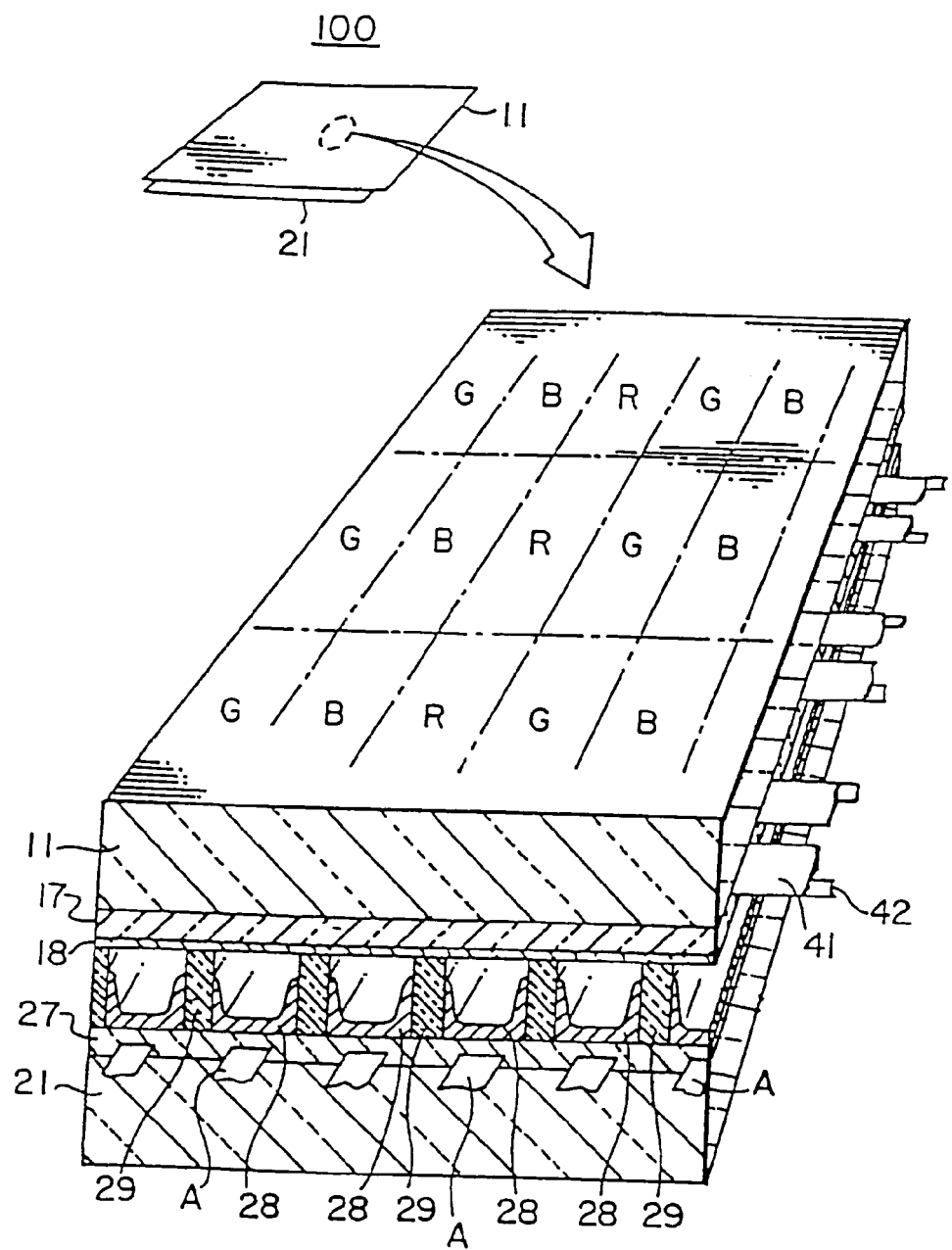
FIG. 2 is a schematic perspective view of a PDP.

FIG. 2 shows an AC-driven surface discharge PDP with three electrodes. The present invention is applicable not only to this type of PDP but also to any type of PDP that has a phosphor. For example, a PDP may be not only AC-driven but also DC-driven and may be of reflection type or of transmission type.

The PDP 100 of FIG. 2 is composed of a front plate and a rear plate.

First, the front plate usually includes a plurality of display electrodes formed on a substrate 11, a dielectric layer 17 formed to cover the display electrodes and a protecting layer 18 formed on the dielectric layer 17 and exposed to a discharge space.

The substrate 11 is not particularly limited and a glass substrate, a quartz glass substrate, a silicon substrate and the like may be mentioned.

The display electrodes comprise transparent electrodes 41 such as of ITO, and bus electrodes 42 (for example, having a three-layer structure of Cr/Cu/Cr) may be formed on the transparent electrodes 41 for reducing the resistance of the display electrodes.

The dielectric layer 17 is formed of a material commonly used for PDPs. Particularly, the dielectric layer 17 may be formed by applying a paste of a low-melting glass and a binder onto the substrate, followed by sintering.

The protecting layer 18 is provided for protecting the dielectric layer 17 from damage due to ion collision caused by discharge for display operation. The protecting layer 18 may be formed, for example, of MgO, CaO, SrO, BaO or the like.

Next, the rear plate usually includes a plurality of address electrodes A formed on a substrate 21 in a direction perpendicular to the display electrodes, a dielectric layer 27 covering the address electrodes A, a plurality of stripe-shaped ribs 29 formed on the dielectric layer 27 between the address electrodes A and phosphor layers 28 formed between the ribs 29 and also covering sidewalls of the ribs.

The substrate 21 and the dielectric layer 27 may be formed of the same materials as those of the substrate 11 and the dielectric layer 17 of the front plate.

The address electrode A is formed, for example, of a metal layer of Al, Cr, Cu or the like or a three-layer structure of Cr/Cu/Cr.

The ribs 29 can be formed by applying a paste of a low-melting glass and a binder onto the dielectric layer 27, followed by drying, and cutting the dried paste by sandblasting. If a photosensitive resin is used as the binder, the ribs 29 can also be formed by exposing and developing the paste using a mask of a desired configuration, followed by sintering.

Referring to FIG. 2, the phosphor layers 28 are formed between the ribs 29. The phosphor of the present invention can be used as a material for the phosphor layers 28. A method for forming the phosphor layers 28 is not particularly limited, but may be a known method. For example, the phosphor layers 28 may be formed by applying a paste of the phosphor dispersed in a solution of a binder in a solvent between the ribs 29 and sintering the paste in the atmosphere.

Next, the front plate and the rear plate are assembled oppositely to each other with the display electrodes (41, 42) crossing the address electrodes A and with the display and address electrodes inside, and a discharge gas is fed into a space defined by the ribs 29. Thus the PDP 100 is produced.

In the above-described PDP, among the ribs, the dielectric layer and the protecting layer which define the discharge space, the phosphor layers are formed on the ribs and the dielectric layer on the rear plate, but phosphor layers may be formed on the protecting film on the front plate in the same manner.

EXAMPLES

The present invention is explained in further details by way of examples, but the invention should not be construed to be limited to the examples.

Example 1

Materials, with a suitable amount of ethanol added thereto, were mixed for three hours under the following conditions:

TABLE 1

| Materials | Phosphor "a" | Phosphor "b" | Phosphor "c" |
|---|---|---|---|
|  | Molar Ratio | | |
| $Al_2O_3$ | 11 | 11 | 11 |
| MgO | 0.97 | 0.97 | 0.97 |
| MnO | 0.03 | 0.03 | 0.03 |
| $La_2O_3$ | 0.8 | 0.7 | 0.6 |
| $Tb_4O_7$ | 0.2 | 0.3 | 0.4 |
| $AlF_3$ | 0.011 | 0.011 | 0.011 |

In the table, the molar ratio means the molar ratio of Al, Mg, Mn, La and Tb.

Figure 3:
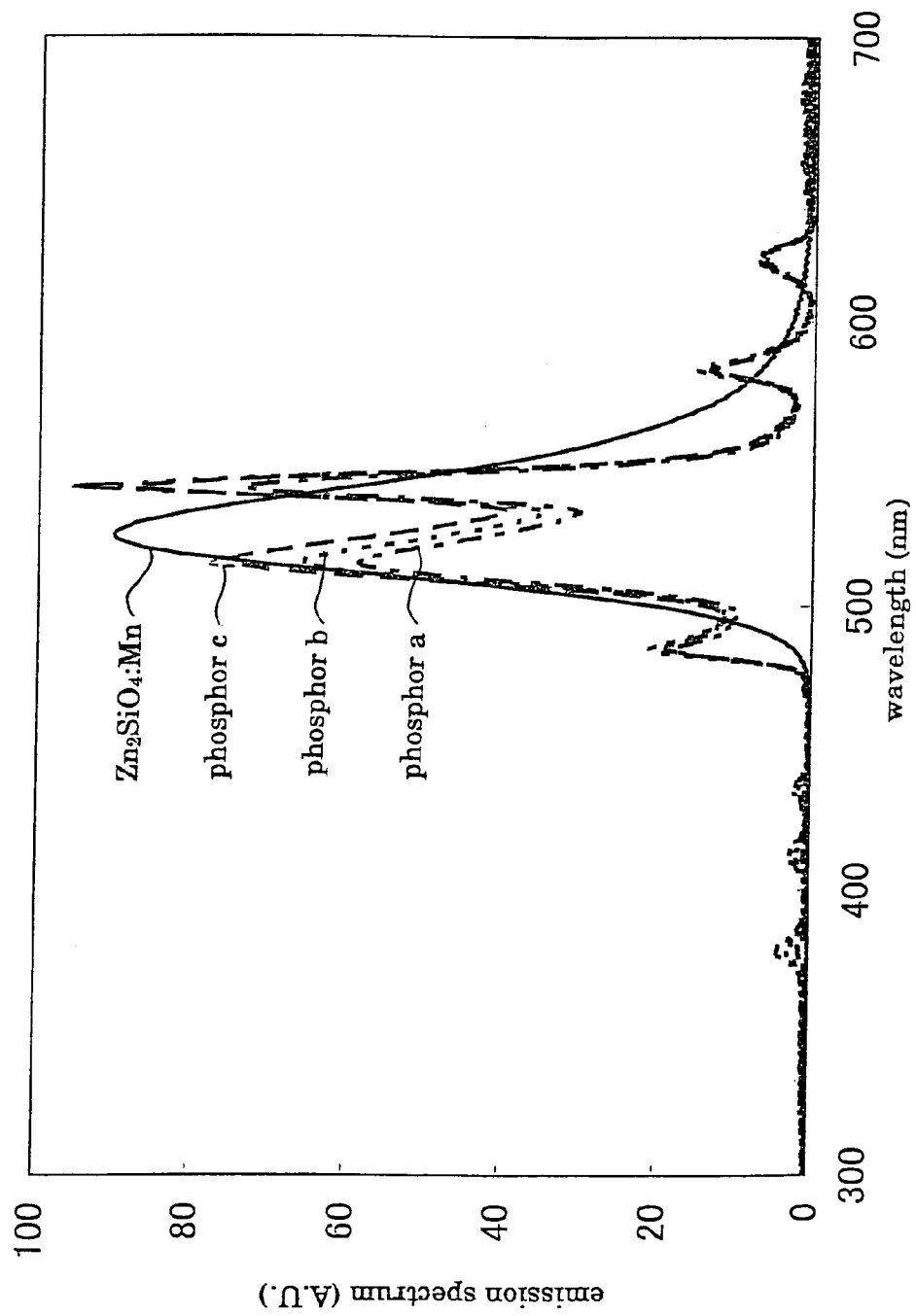
FIG. 3 illustrates emission spectra of phosphors in accordance with Example 1 of the present invention, and FIGS. 3-1, 3-2, 3-3 and 3-4 individually show the lines in FIG. 3.
Figures 1, 3:
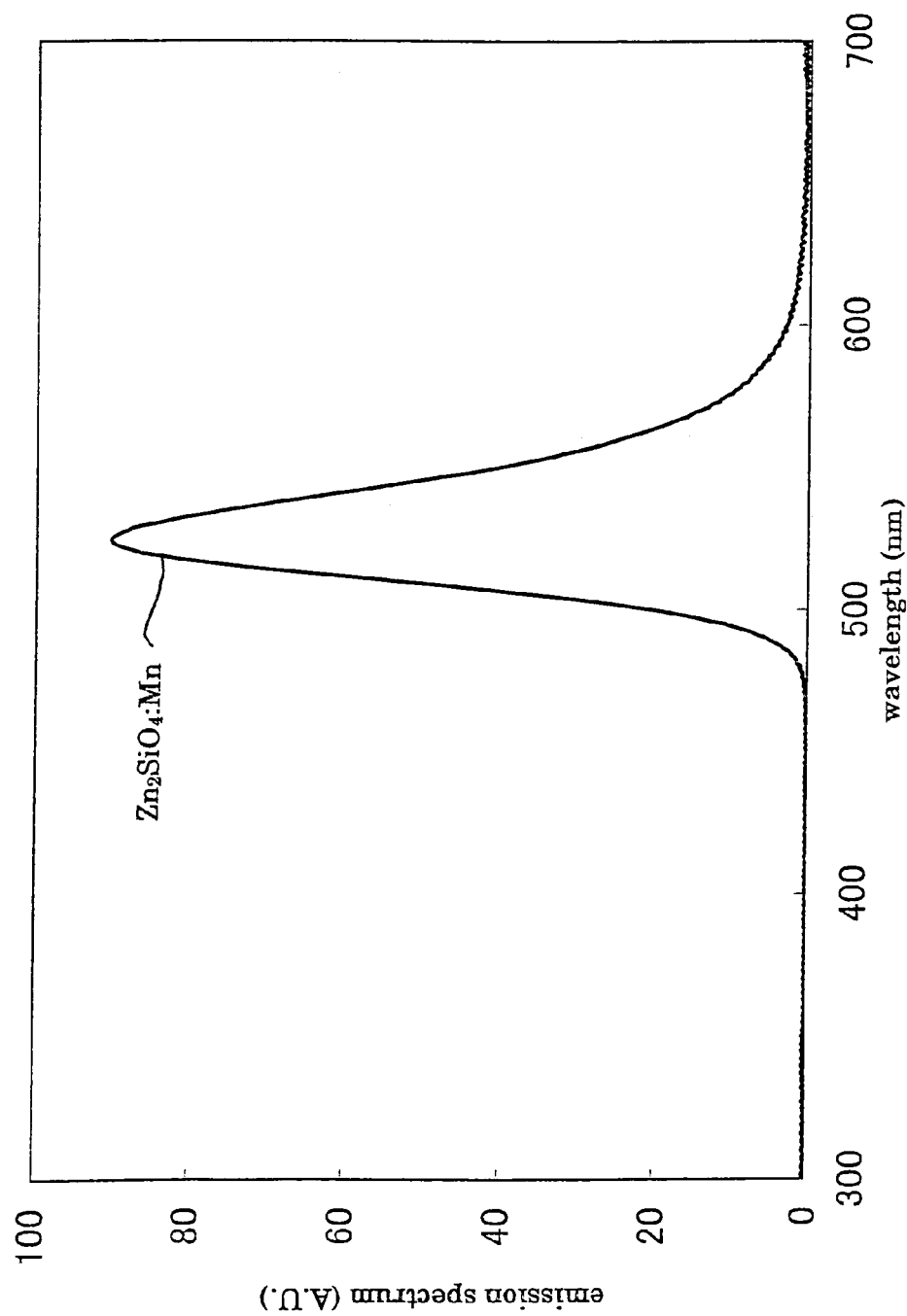
Figures 2, 3:
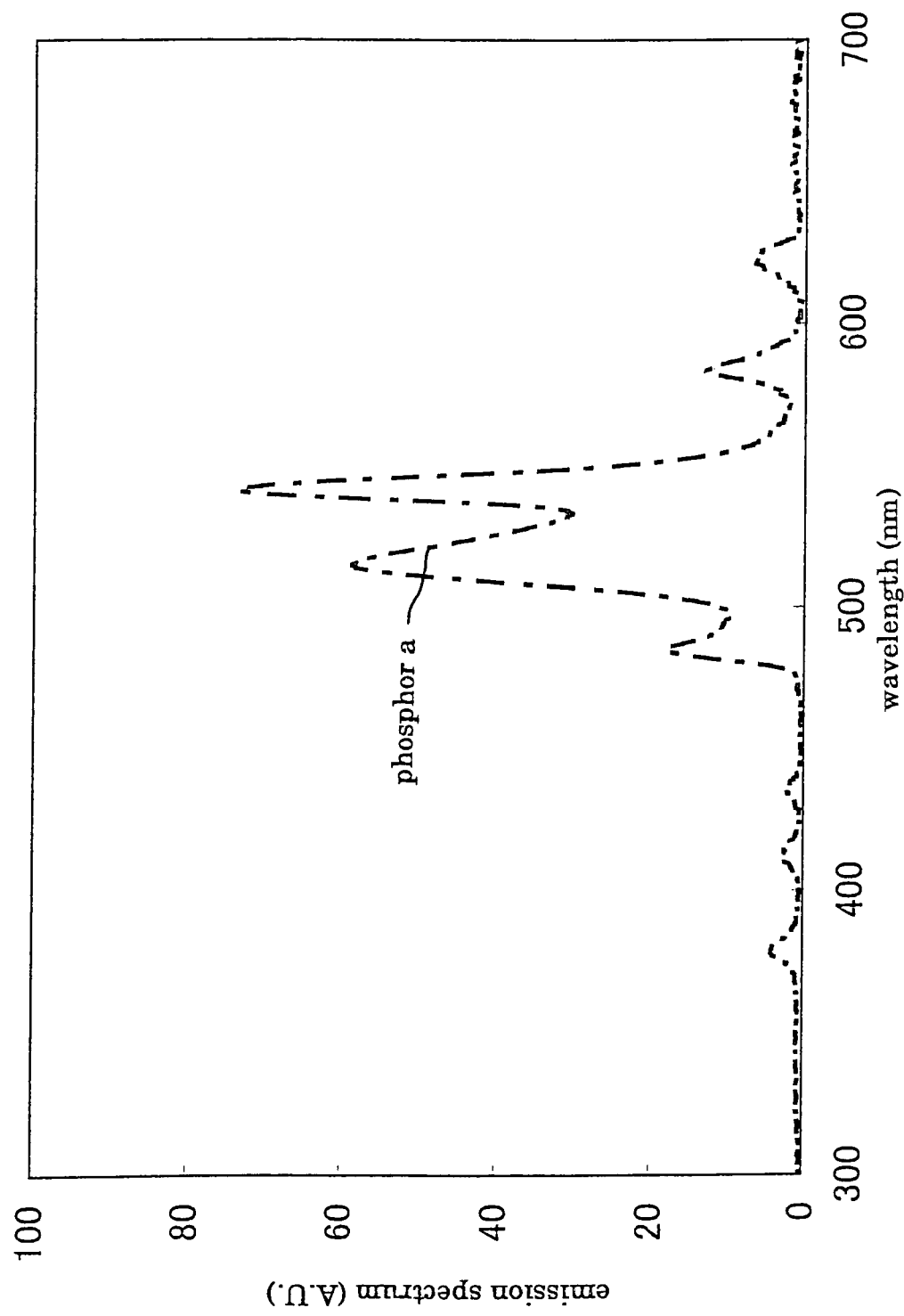
Figure 3:
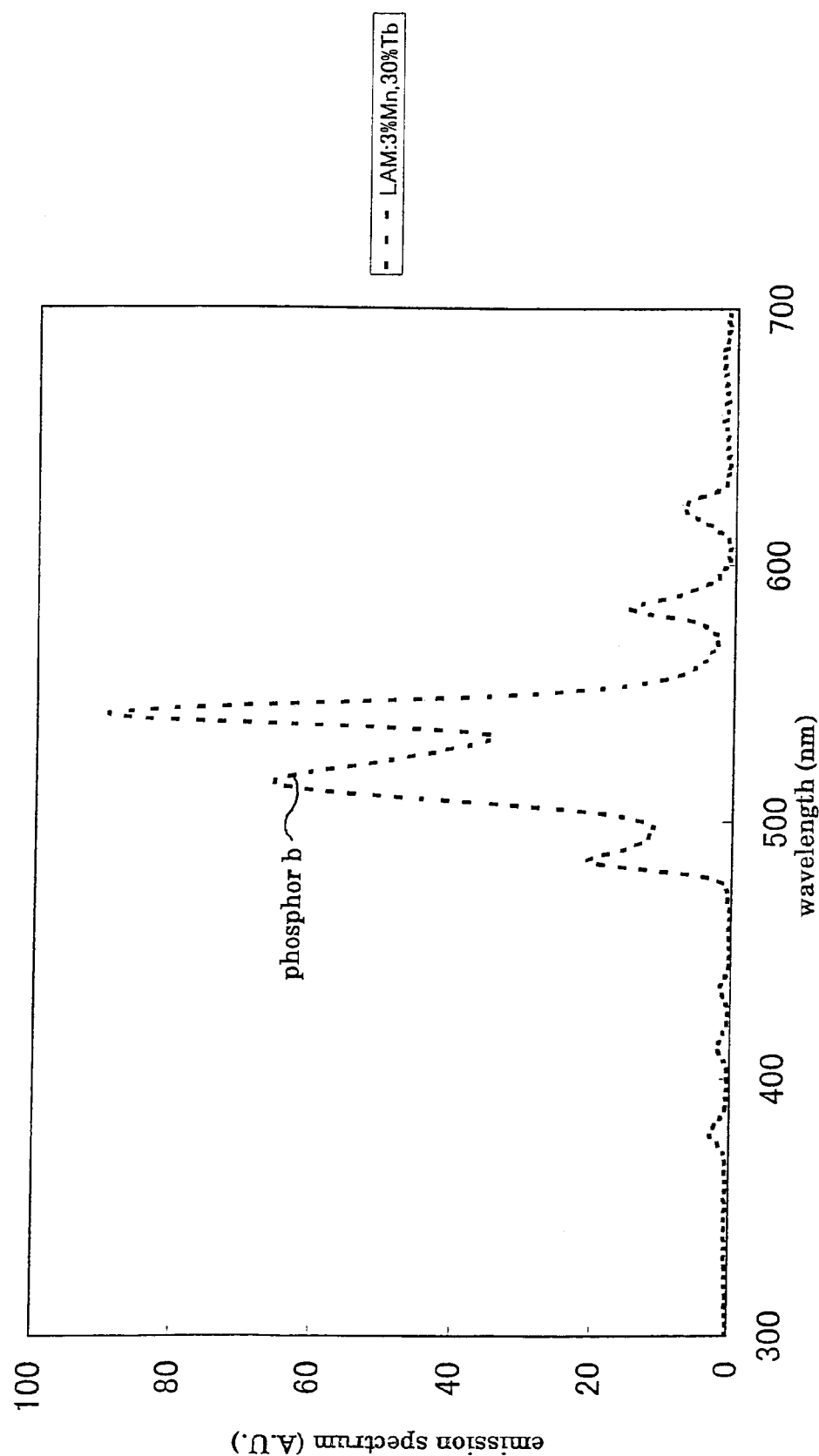
Figures 3, 4:
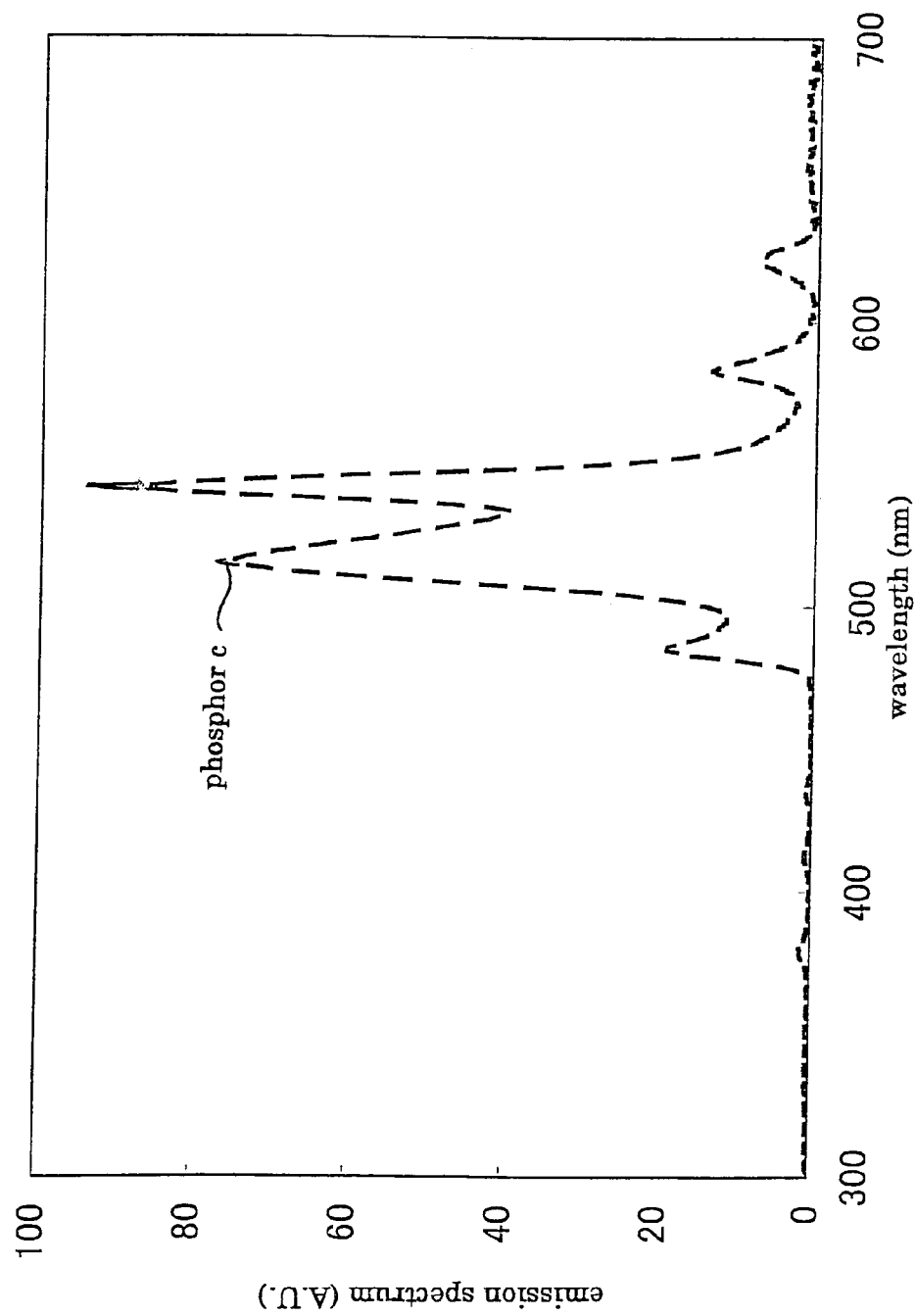
FIG. 4 illustrates emission spectra of phosphors of LAM: Tb in accordance with Example 1 of the present invention, and FIGS. 4-1, 4-2, 4-3, 4-4, 4-5 and 4-6 individually show the lines in FIG. 4.
Figures 1, 4:
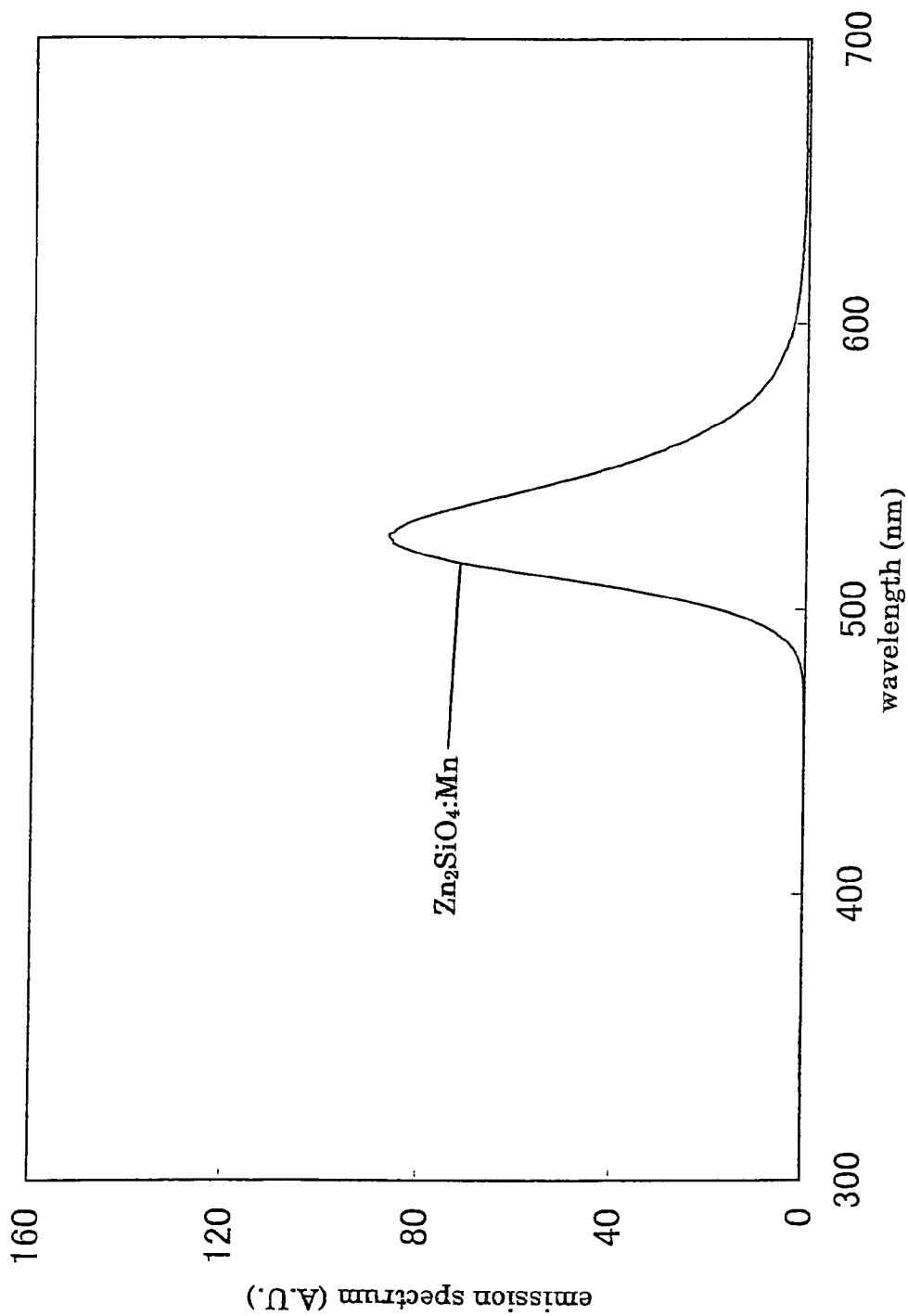
Figures 2, 4:
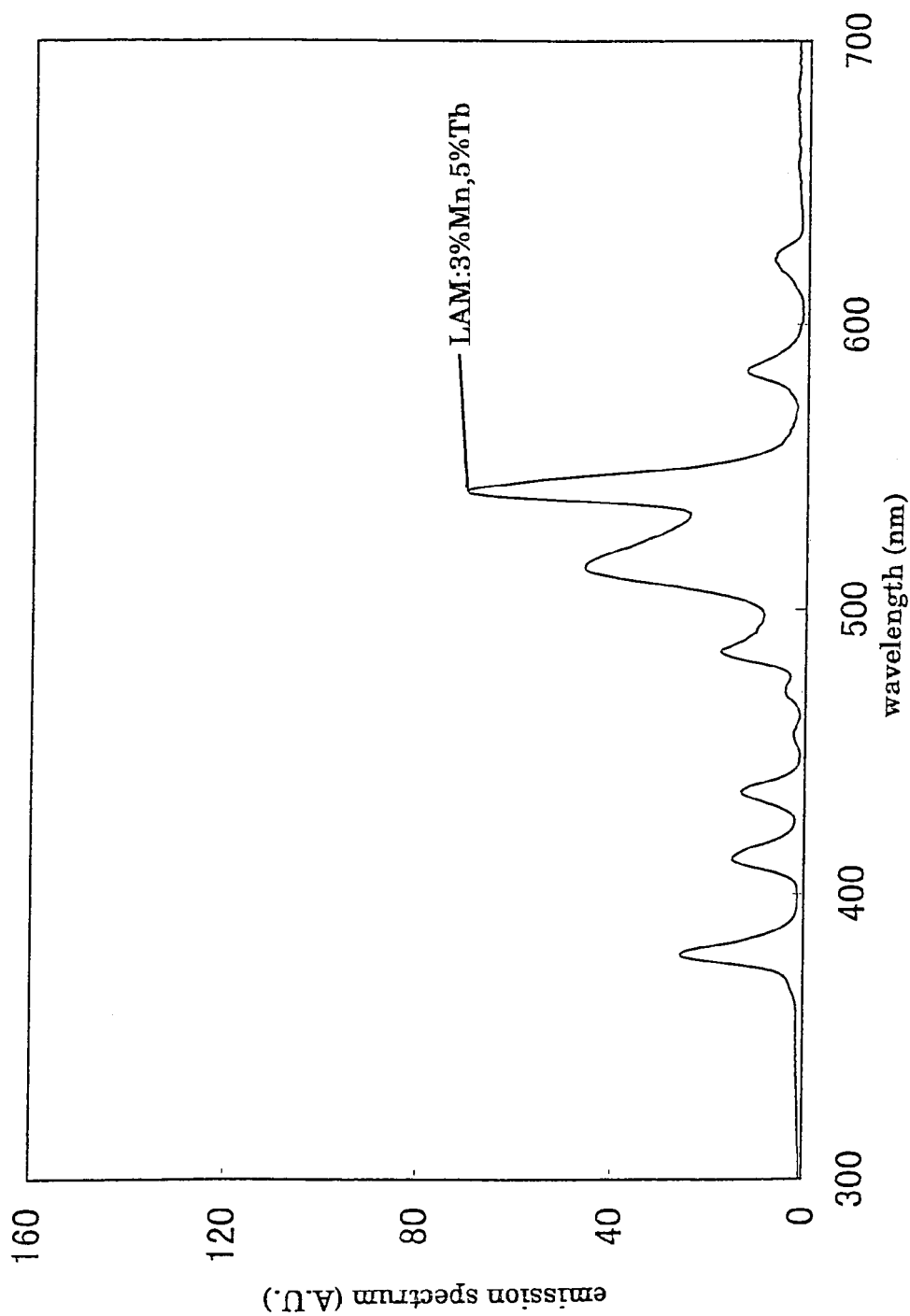
Figures 3, 4:
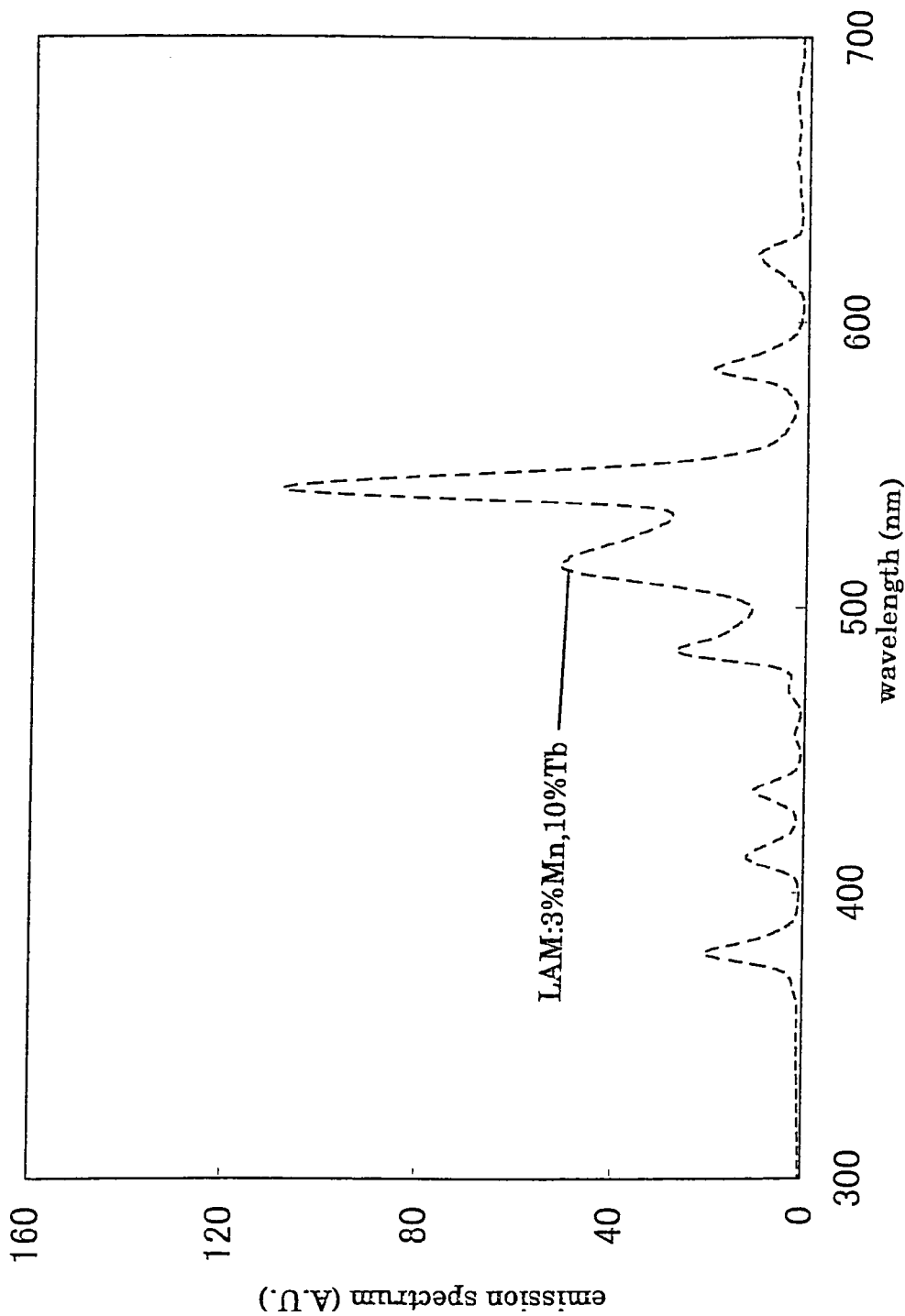
Figure 4:
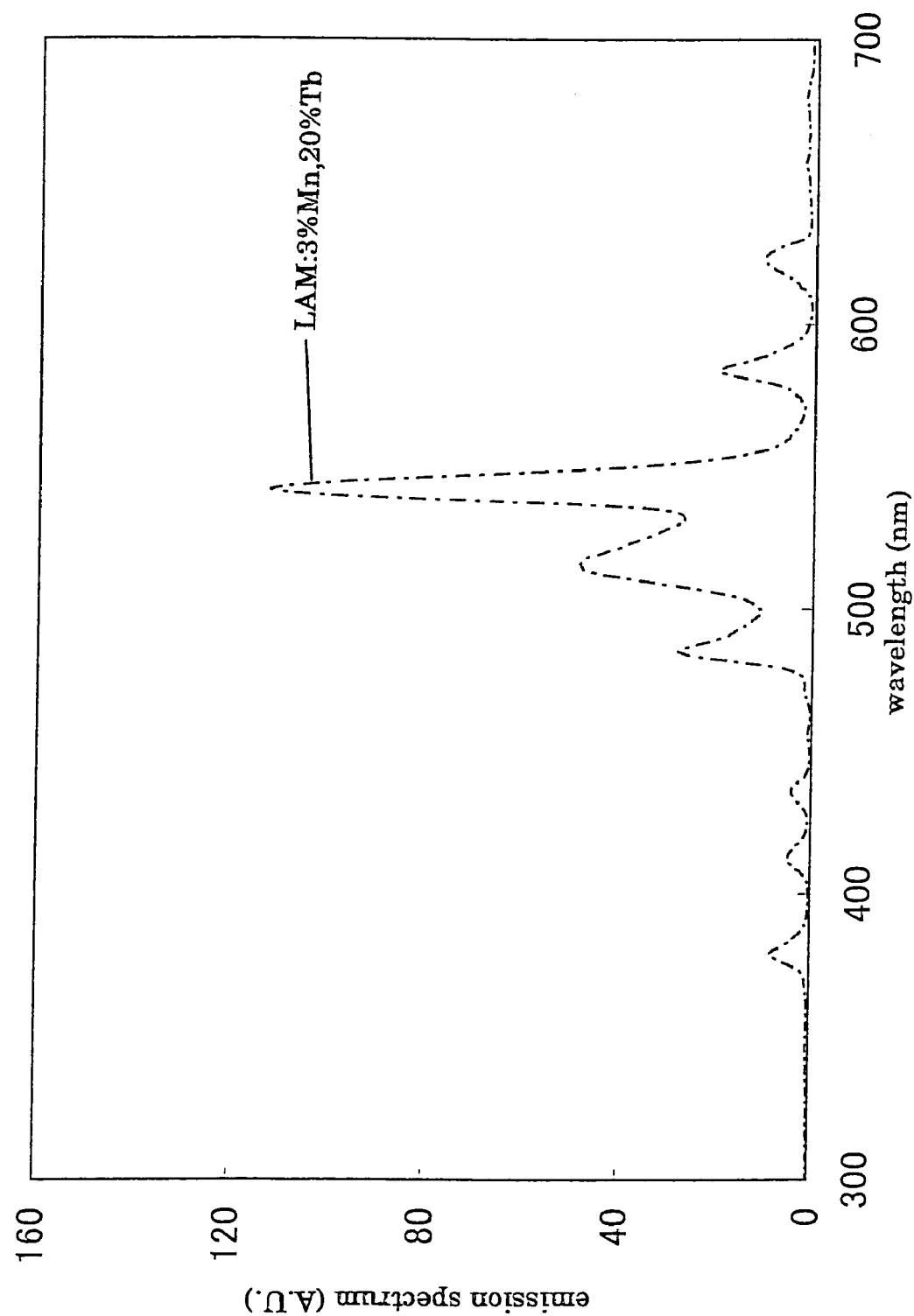
Figures 4, 5:
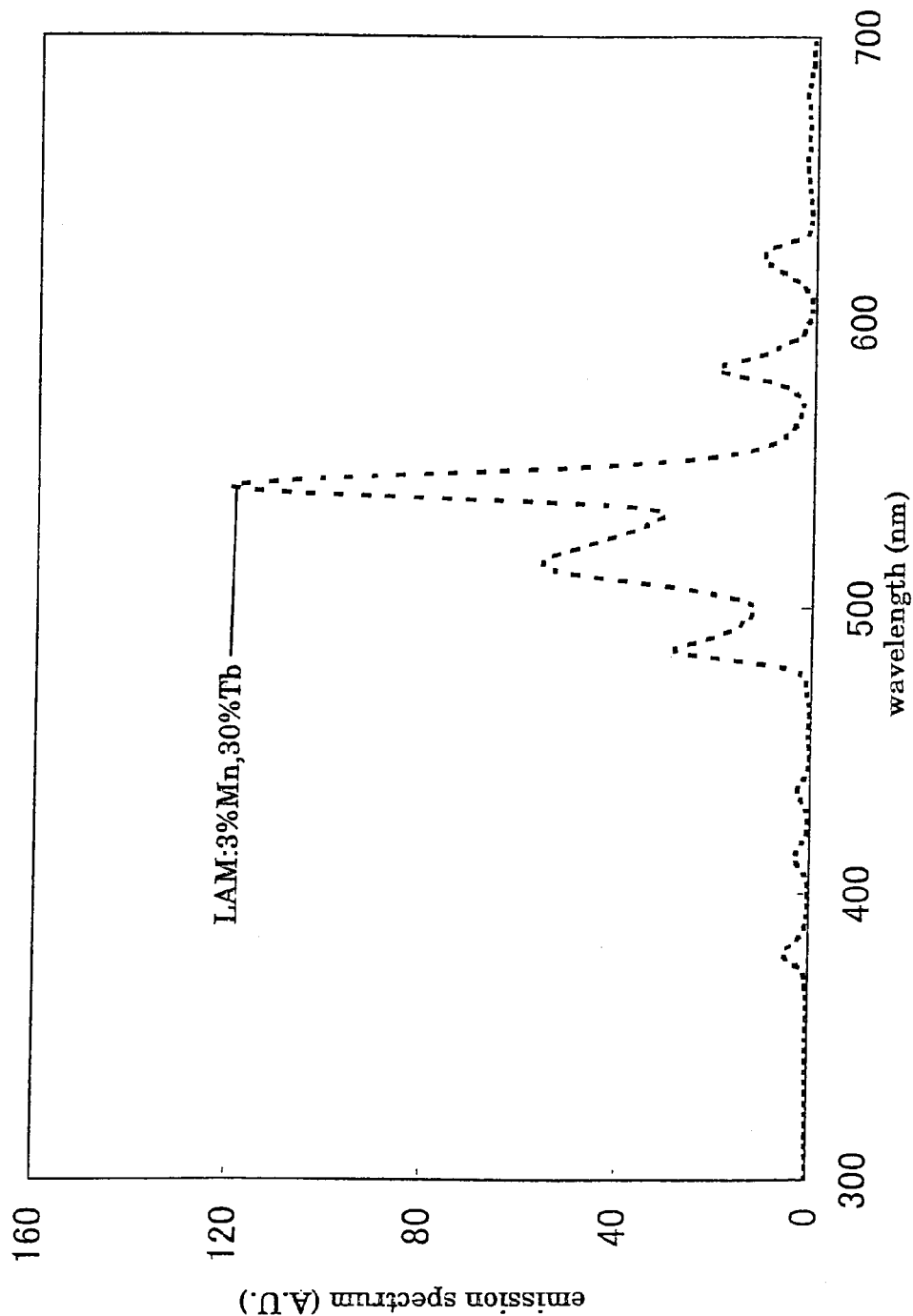
FIG. 5 is a graph showing a dependence of the emission amount of LAM:Tb of Example 1 upon the concentration of Tb.

The resulting mixtures were sintered at 1,500° C. for four hours in a nitrogen atmosphere containing 2 vol % of hydrogen. The obtained sinters were pulverized to give phosphors "a" to "c" represented by $LaMgAl_{11}O_{19}$:Mn, Tb. It was verified by X-ray diffraction analysis that the resulting phosphors "a" to "c" had the magnetoplumbite-type crystal structure. The phosphors "a" to "c" emitted green light upon being irradiated with light of 147 nm wavelength. FIG. 3 shows emission spectra of the phosphors by light of 147 nm. The amount and chromaticity of the light emitted from the phosphors were almost equal to those of $Zn_2SiO_4$:Mn. In FIG. 3, the host material is referred to LAM for short. Light emission by light of 172 nm is also shown (see FIG. 4). In this case, an emission amount about 1.3 times larger than the maximum emission amount of $Zn_2SiO_4$:Mn can be obtained. Further, FIG. 5 shows a change in the emission amount by excitation light of 147 nm and 172 nm with the Mn concentration fixed at 3 atom % and the Tb concentration varied.

Construction of PDP:
 Display electrodes
 Transparent electrode width: 280 μm
 Bus electrode width: 100 μm
 Discharge gap between display electrodes: 100 μm
 Thickness of dielectric layer: 30 μm
 Height of ribs: 100 μm
 Pitch of ribs: 360 μm
 Discharge gas of Ne—Xe (5%)
 Gas pressure: 500 Torr Example 2

Phosphors "d" and "e" were produced in the same manner as in Example 1 using the following materials. The phosphor "d" is represented by $LaMgAl_{11}O_{19}$:Mn and the phosphor "e" is represented by $LaMgAl_{11}O_{19}$:Tb. The phosphor a is the same as that of Example 1.

TABLE 2

| Materials | Phosphor "d" | Phosphor "e" | Phosphor "a" |
|---|---|---|---|
|  | Molar Ratio | | |
| $Al_2O_3$ | 11 | 11 | 11 |
| MgO | 0.97 | 1 | 0.97 |
| MnO | 0.03 | — | 0.03 |
| $La_2O_3$ | 1 | 0.6 | 0.6 |
| $Tb_4O_7$ | — | 0.4 | 0.4 |
| $AlF_3$ | 0.011 | 0.011 | 0.011 |

In the table, the molar ratio means the molar ratio of Al, Mg, Mn, La and Tb.

Figures 4, 5, 6:
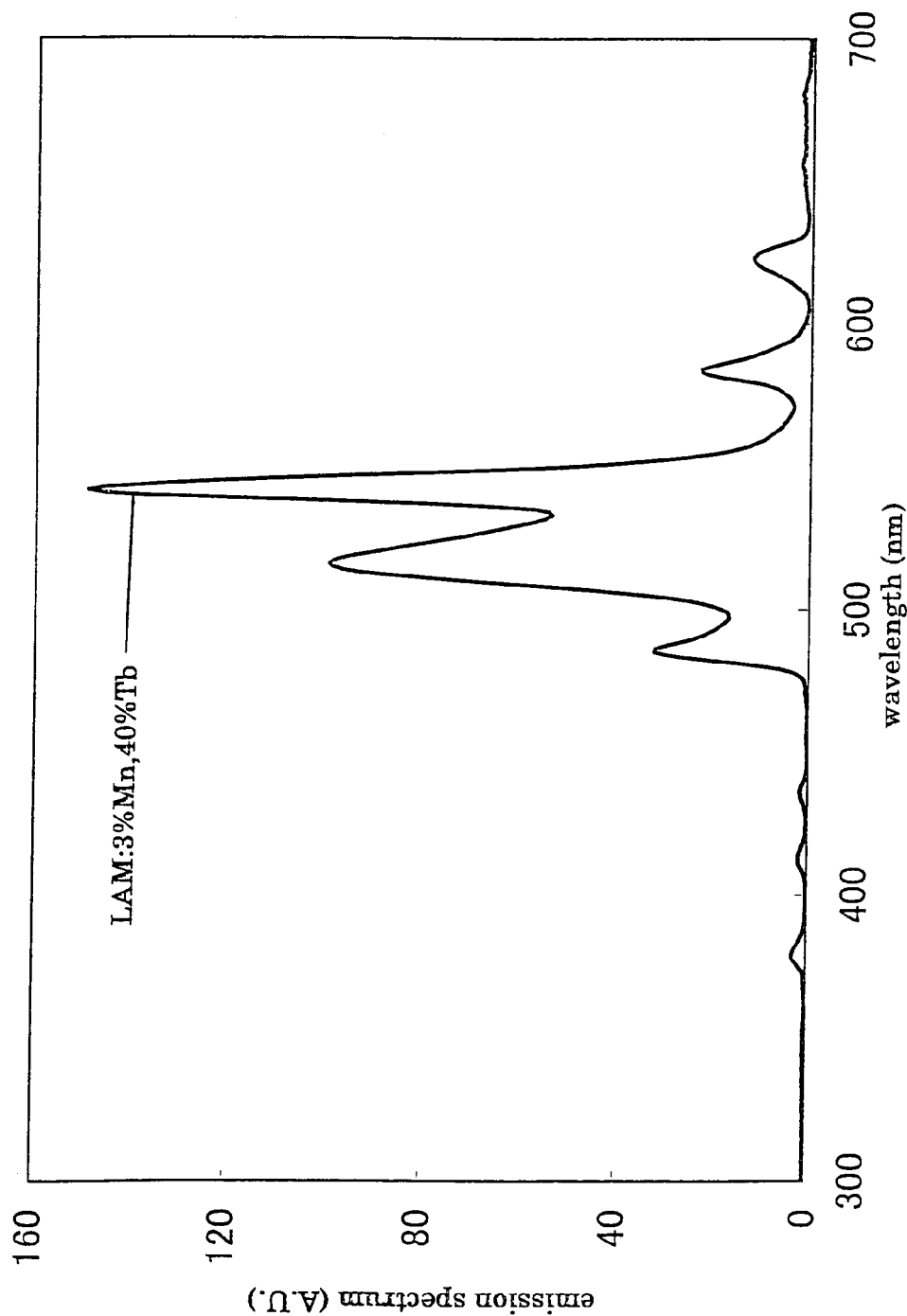
FIG. 6 is a graph showing a dependence of the luminance of phosphors of Example 2 upon driving frequency, and FIGS. 6-1, 6-2, 6-3 and 6-4 individually show the lines in FIG. 6.
Figure 5:
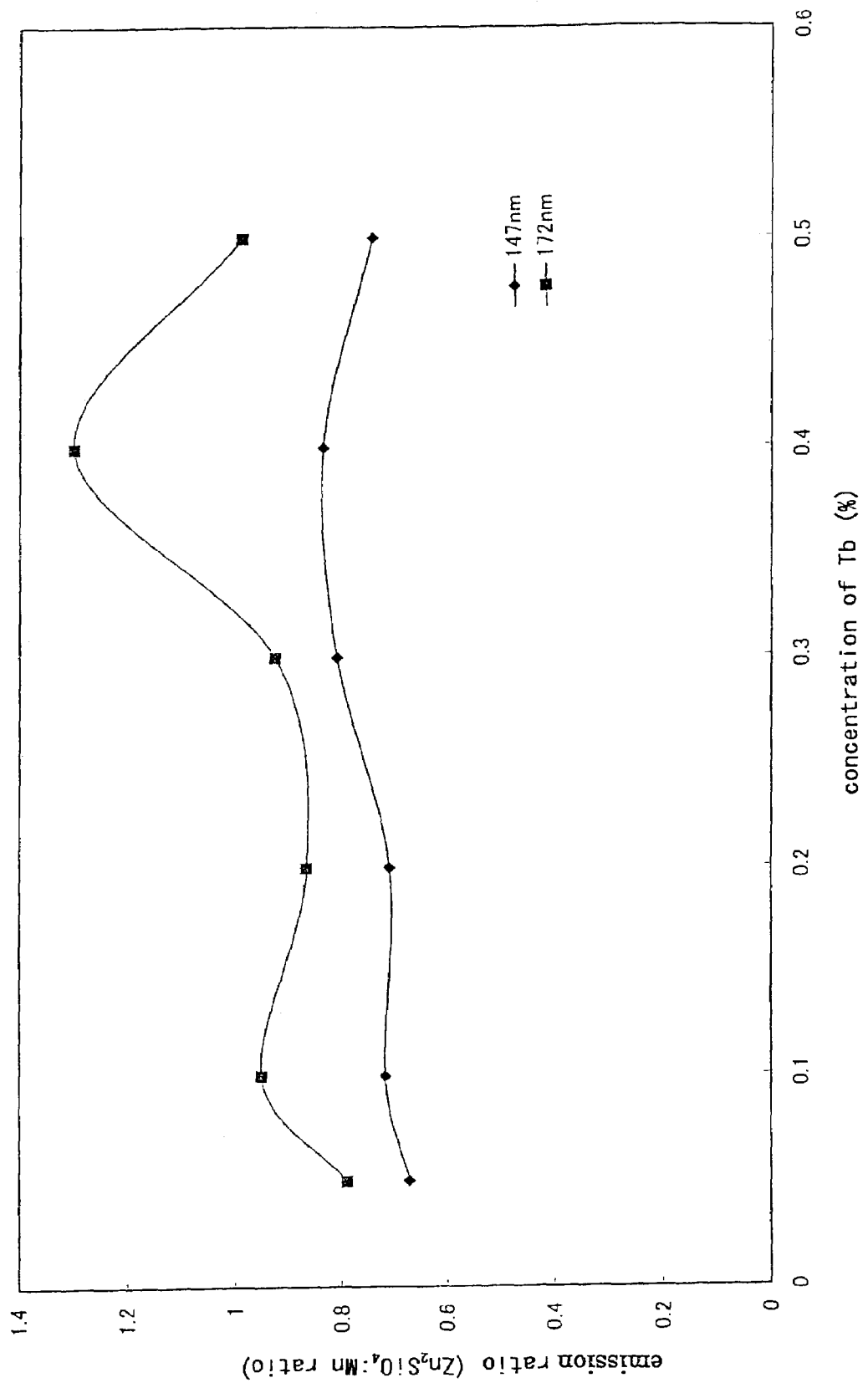
Figure 6:
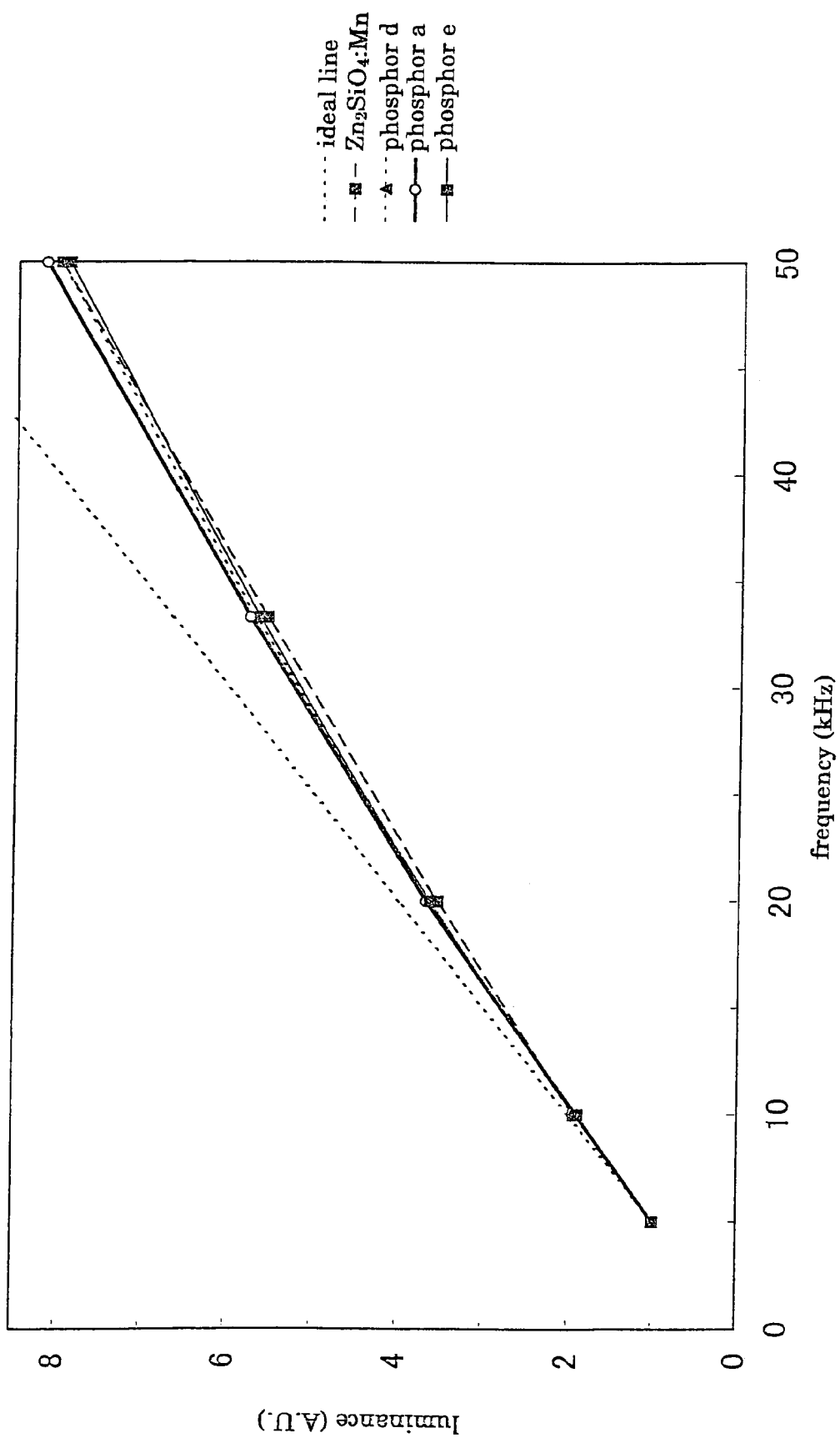
Figures 1, 6:
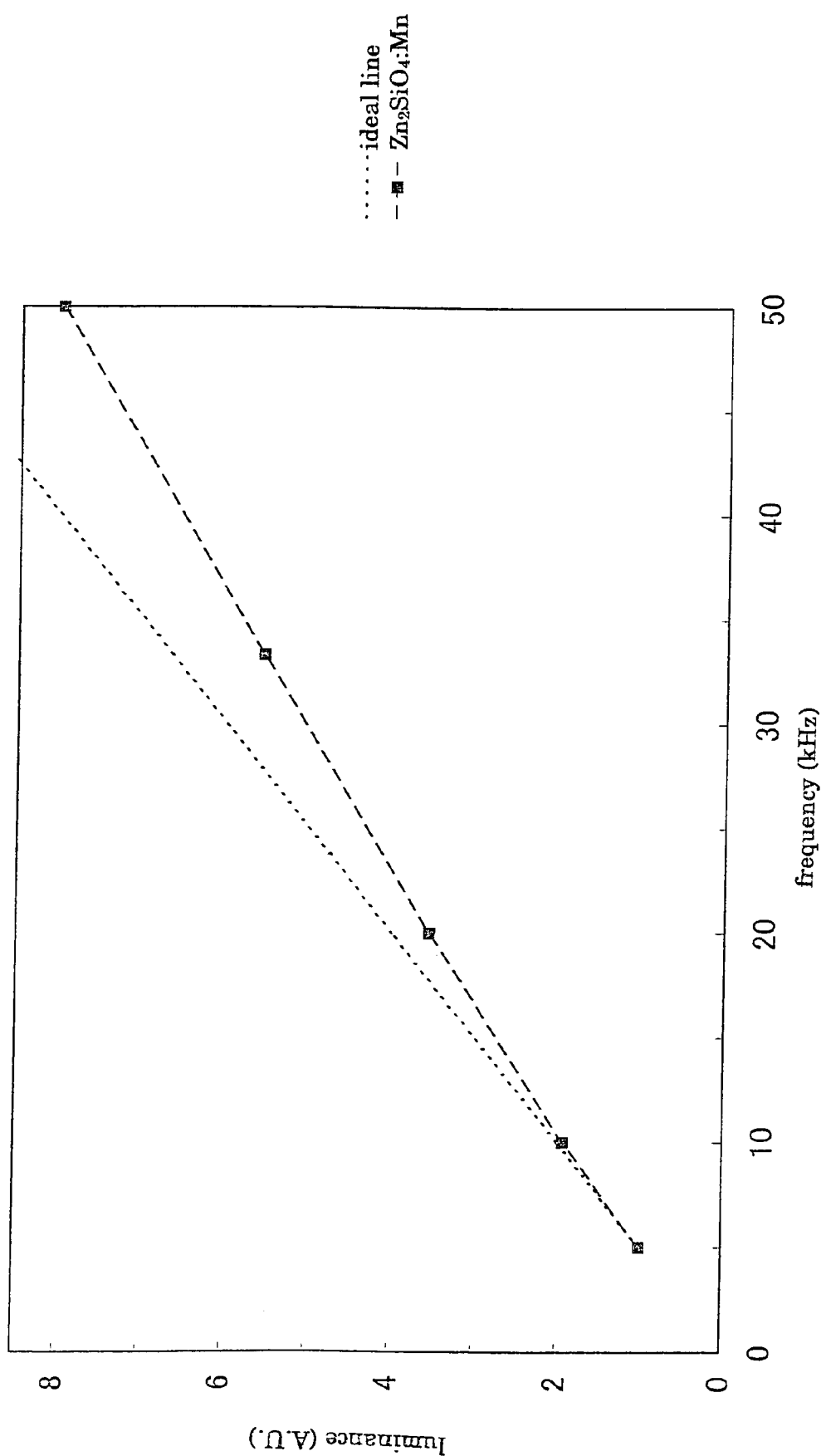
Figures 2, 6:
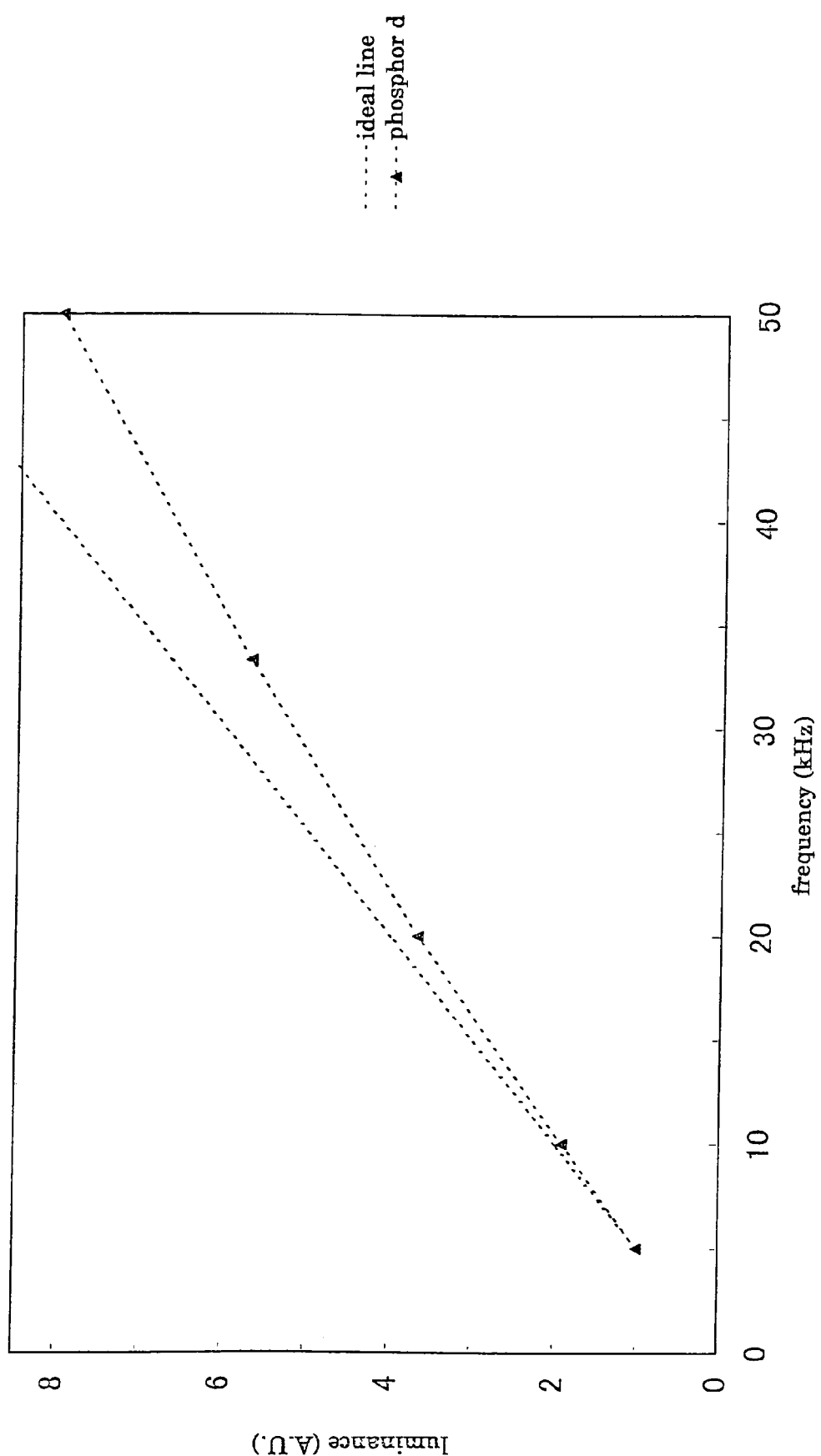
Figures 3, 6:
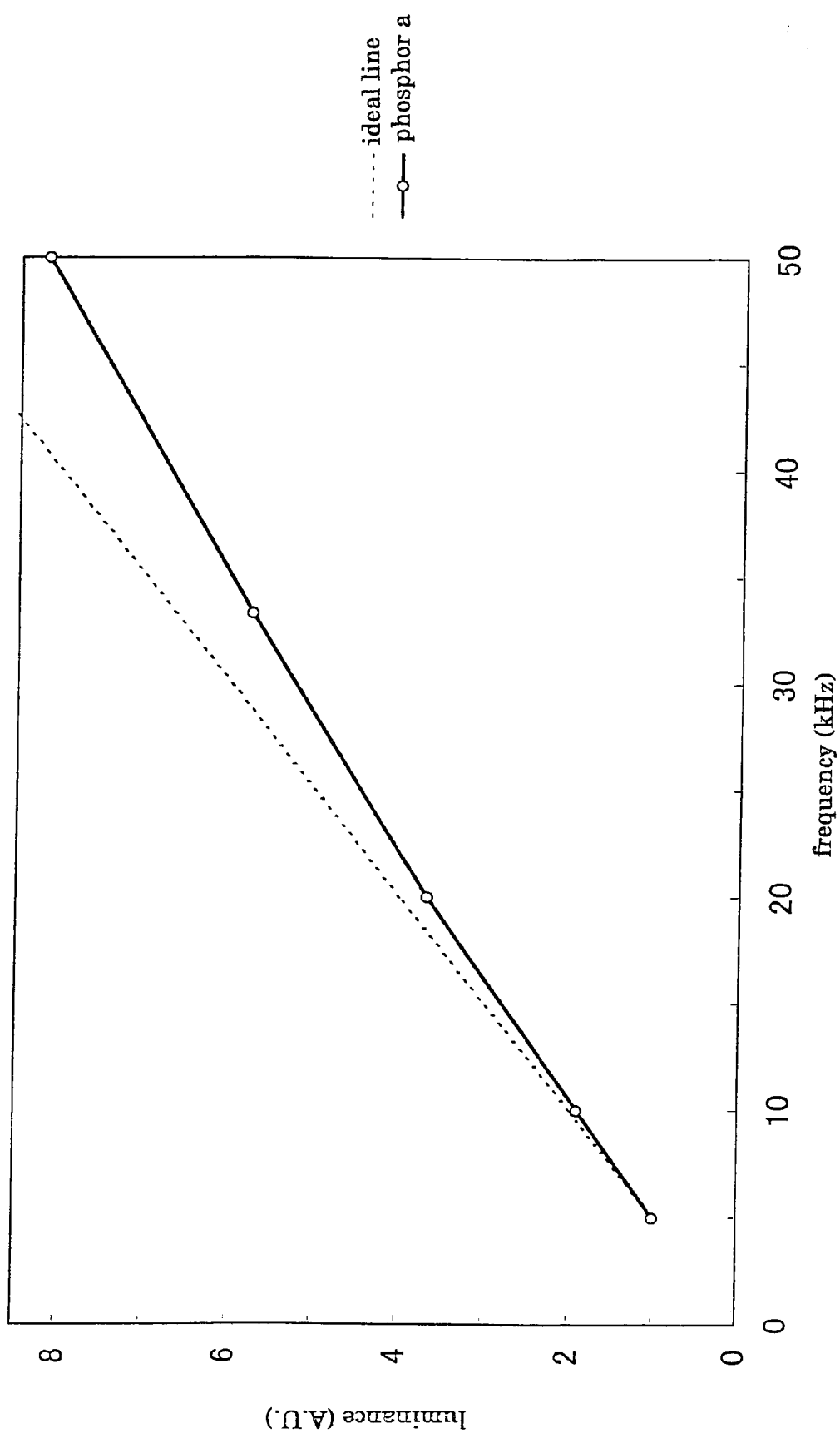
Figures 4, 6:
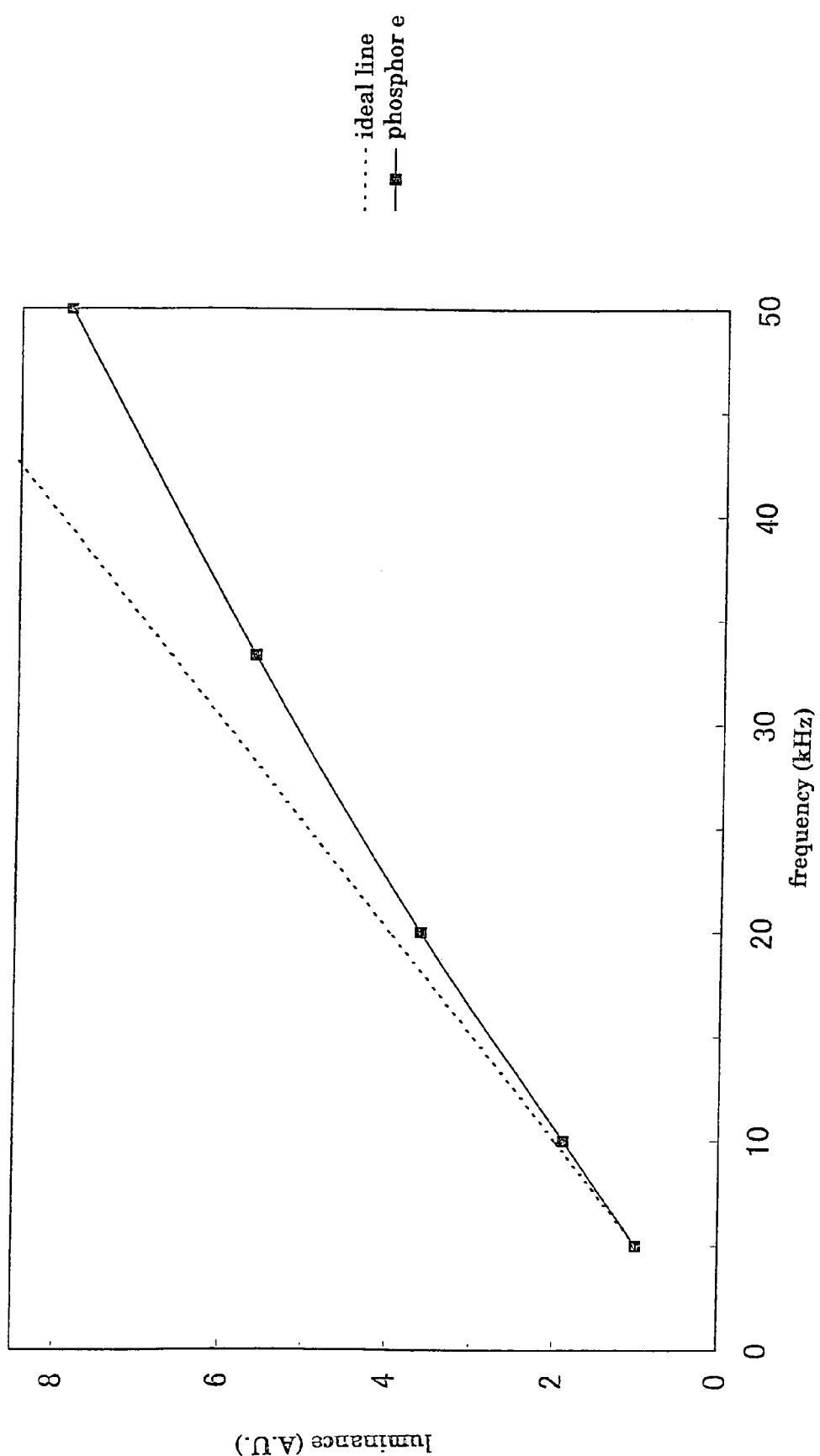

The above phosphors were used for producing surface discharge PDPs with three electrodes in the same manner as in Example 1. The phosphors were tested about a change of their luminance with respect to a driving frequency by applying a rectangular pulse having an amplitude of 180 V and a time width of 8 μs across bus electrodes of display electrodes. The results are shown in FIG. 6, in which a dotted line is an ideal line representing a case where the luminance is assumed not to become slower as the driving frequency increases.

The change of the luminance of the phosphors with respect to the driving frequency was almost equal to that of $Zn_2SiO_4$:Mn. It was found that the phosphor containing both Mn and Tb had an improved luminance saturation characteristic to the driving frequency as compared with those containing either one of Mn and Tb.

Figure 7:
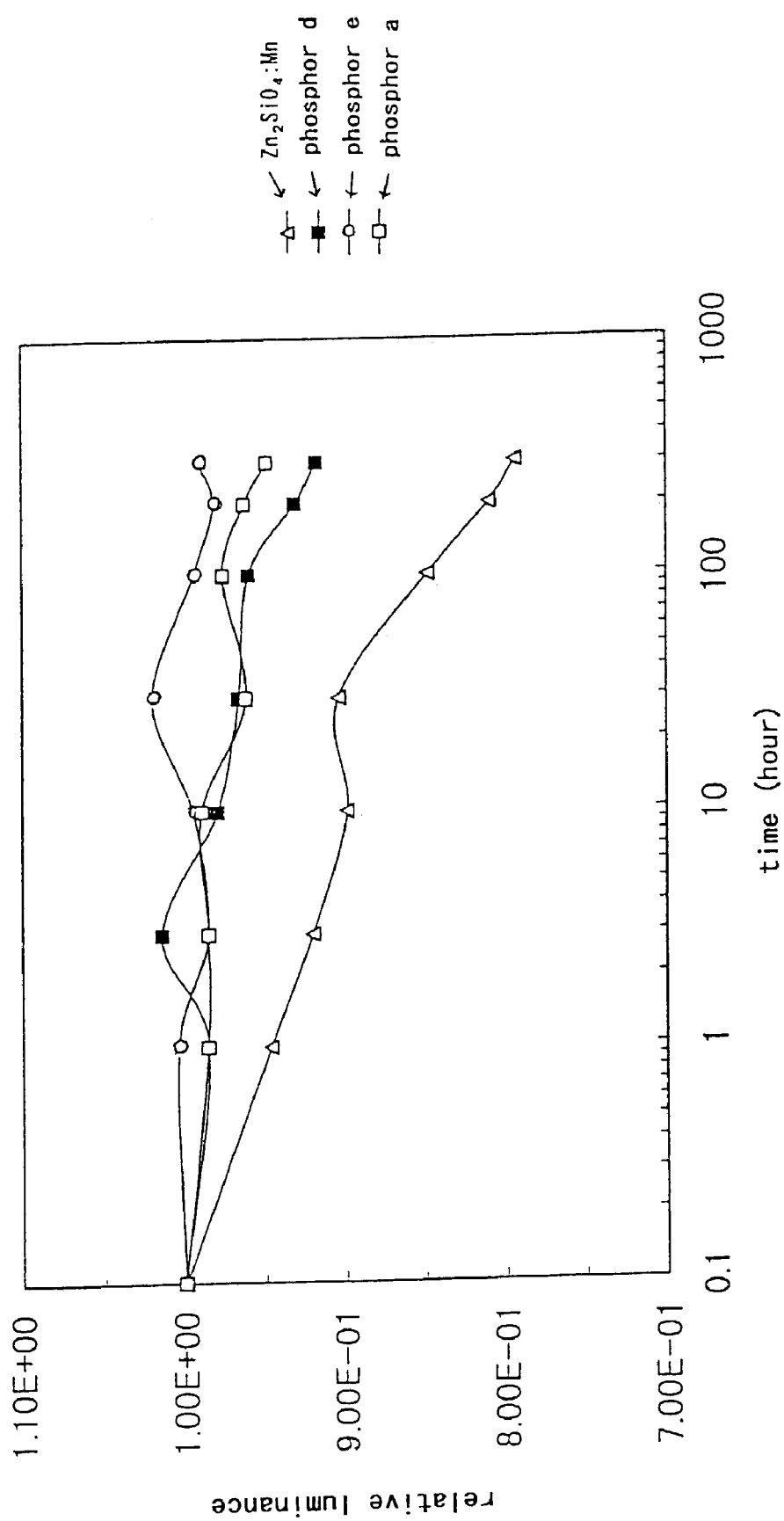
FIG. 7 is a graph showing a change of the luminance of phosphors of Example 2 at every drive period of time.

FIG. 7 shows a change of the luminance of the phosphors every time when the PDPs have been operated for given time periods. It was found that the luminance of the phosphors of Example 2 changed less than $Zn_2SiO_4$:Mn.

Example 3

Phosphors "f" to "j" represented by $LaMgAl_{11}O_{19}$:Tb were produced in the same manner as in Example 1 using the following materials:

TABLE 3

| Materials | Phosphor "f" | Phosphor "g" | Phosphor "h" | Phosphor "i" | Phosphor "j" |
|---|---|---|---|---|---|
|  | Molar Ratio | | | | |
| $Al_2O_3$ | 11 | 11 | 11 | 11 | 11 |
| MgO | 1 | 1 | 1 | 1 | 1 |

TABLE 3-continued

| Materials | Phosphor "f" | Phosphor "g" | Phosphor "h" | Phosphor "i" | Phosphor "j" |
|---|---|---|---|---|---|
| | Molar Ratio | | | | |
| $La_2O_3$ | 0.95 | 0.9 | 0.8 | 0.7 | 0.6 |
| $Tb_4O_7$ | 0.05 | 0.1 | 0.2 | 0.3 | 0.4 |
| $AlF_3$ | 0.011 | 0.011 | 0.011 | 0.011 | 0.011 |

In the table, the molar ratio means the molar ratio of Al, Mg, La and Tb.

Figure 8:
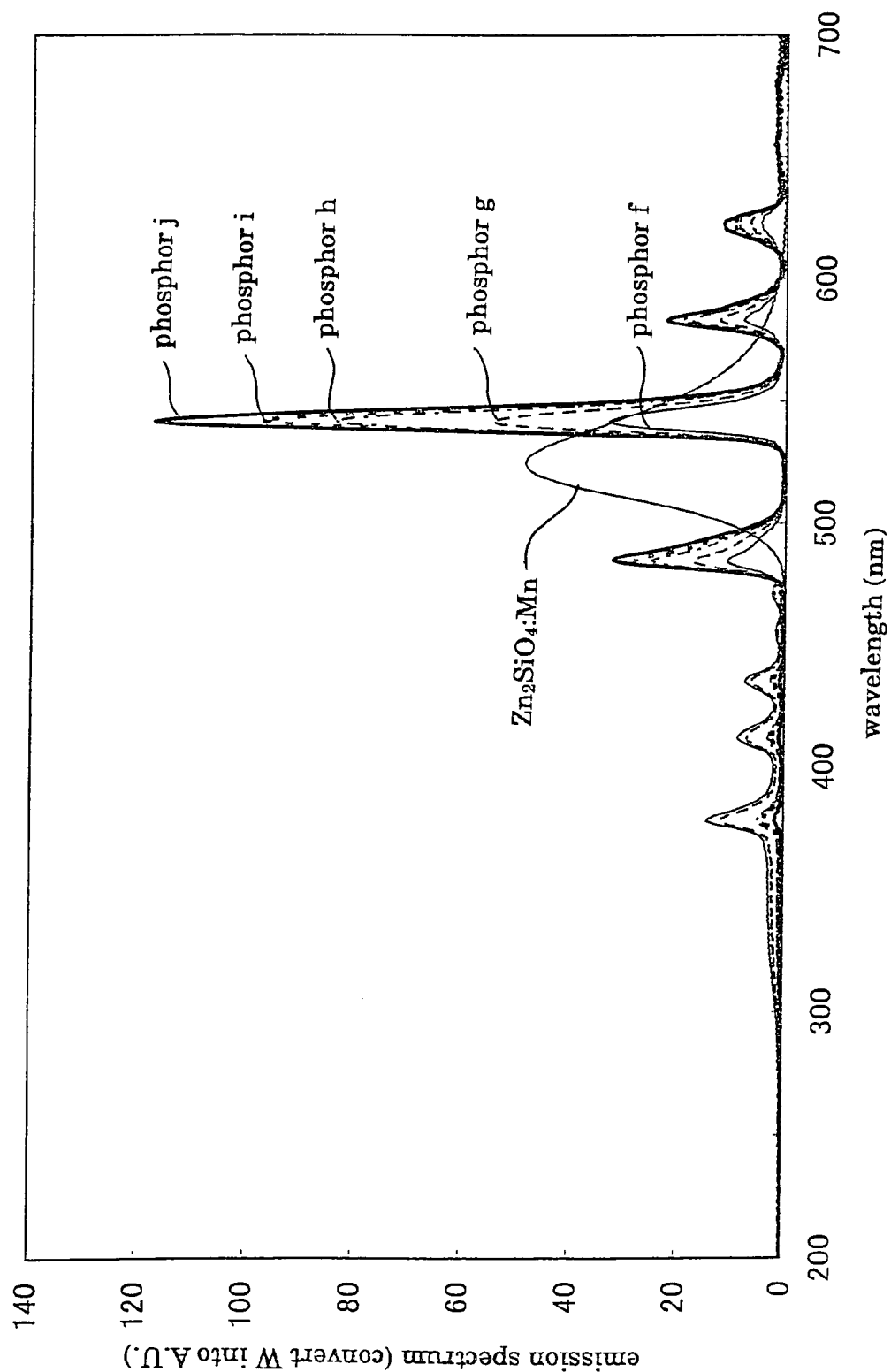
FIG. 8 illustrates emission spectra of phosphors in accordance with Example 3 of the present invention, and FIGS. 8-1, 8-2, 8-3. 8-4, 8-5 and 8-6 individually show the lines in FIG. 8.
Figures 1, 8:
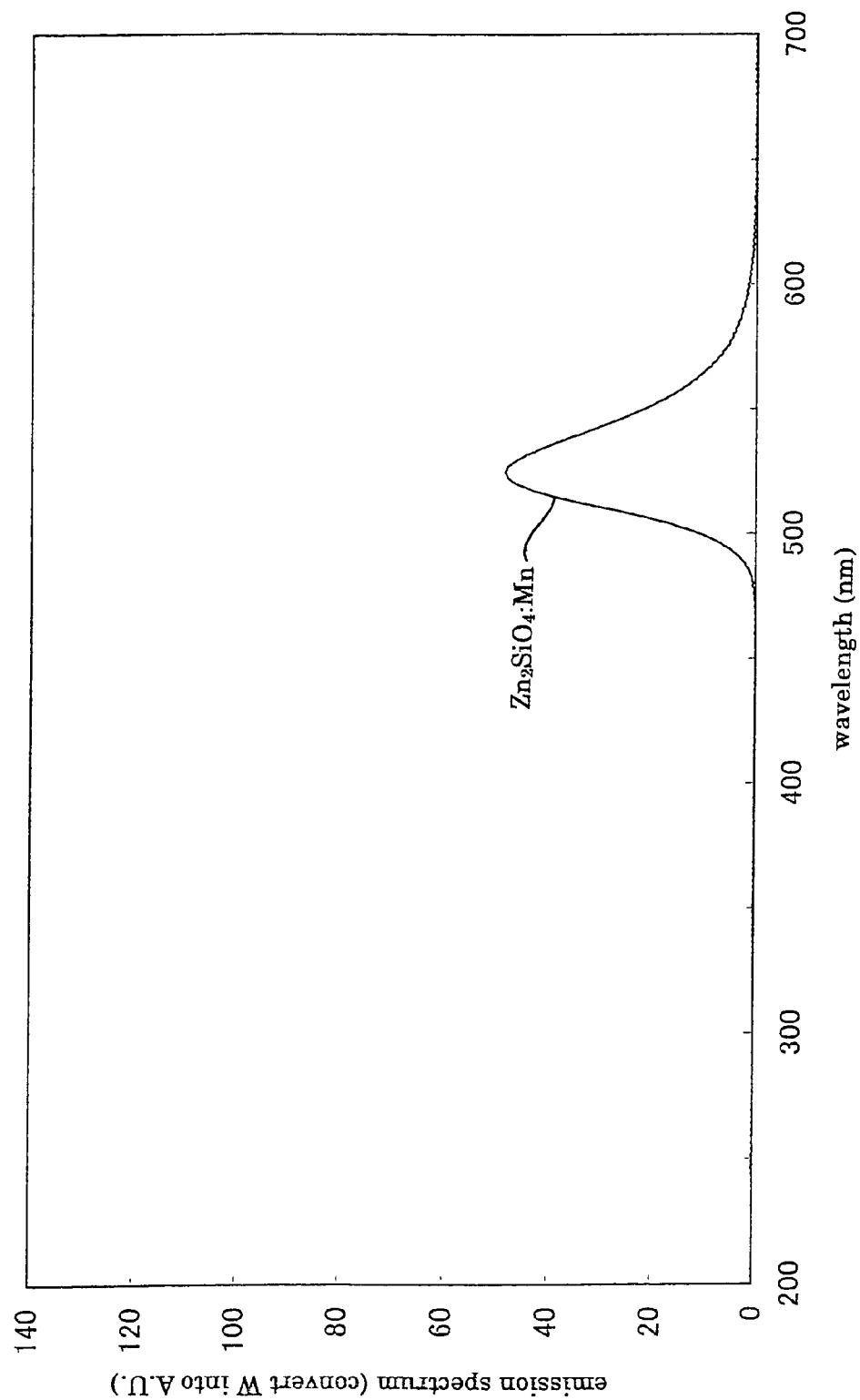
Figures 2, 8:
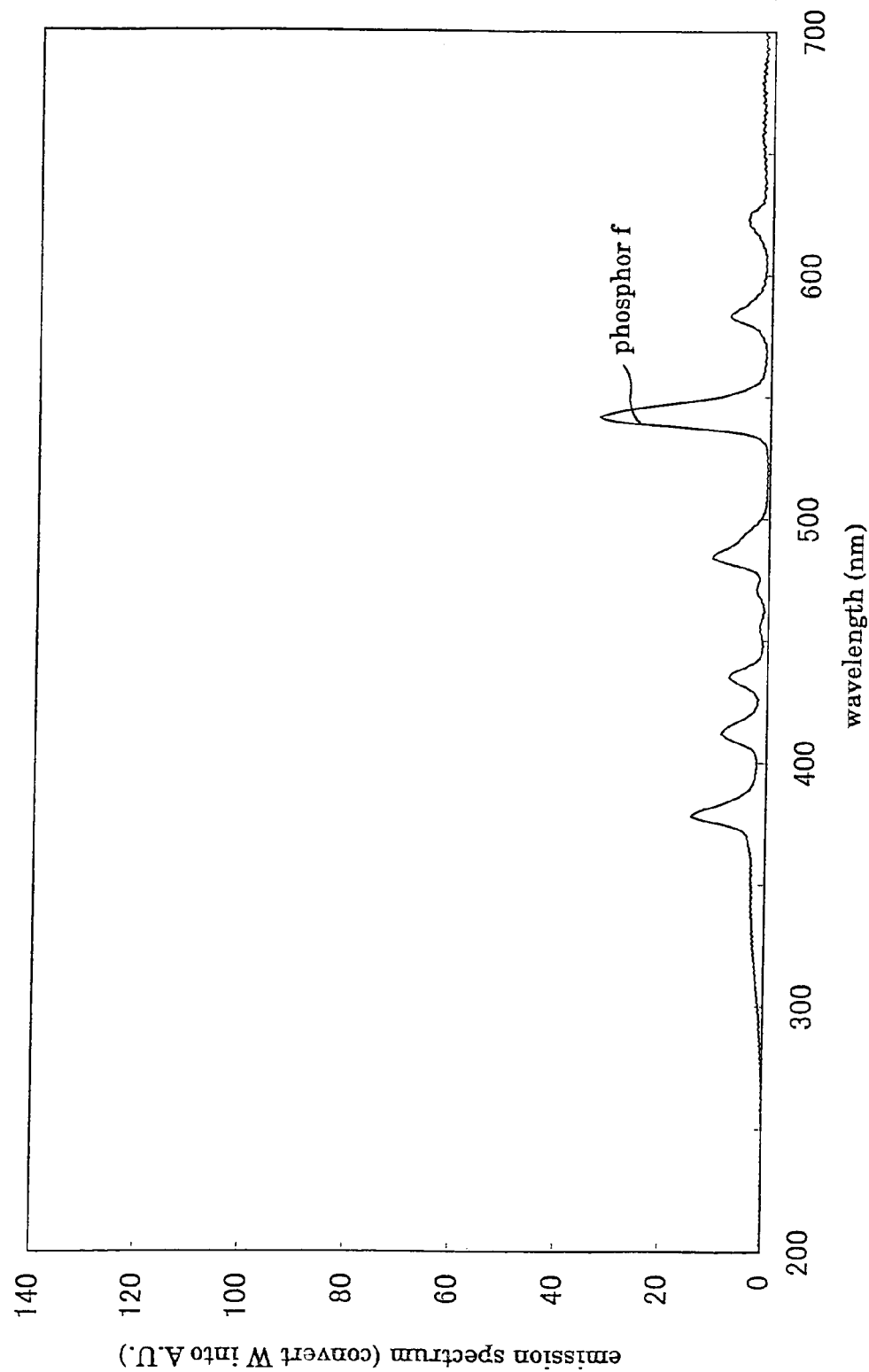
Figures 3, 8:
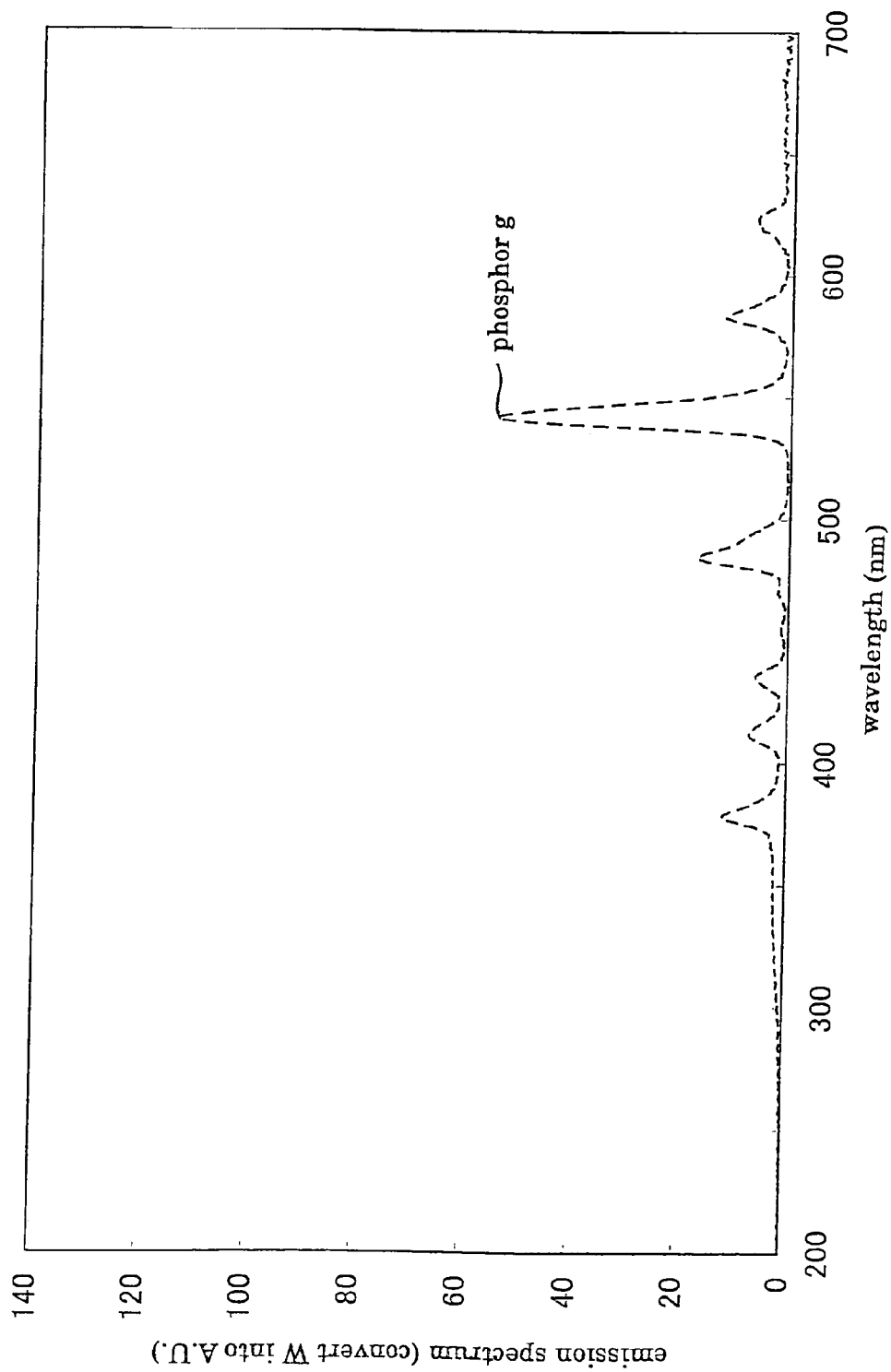
Figures 4, 8:
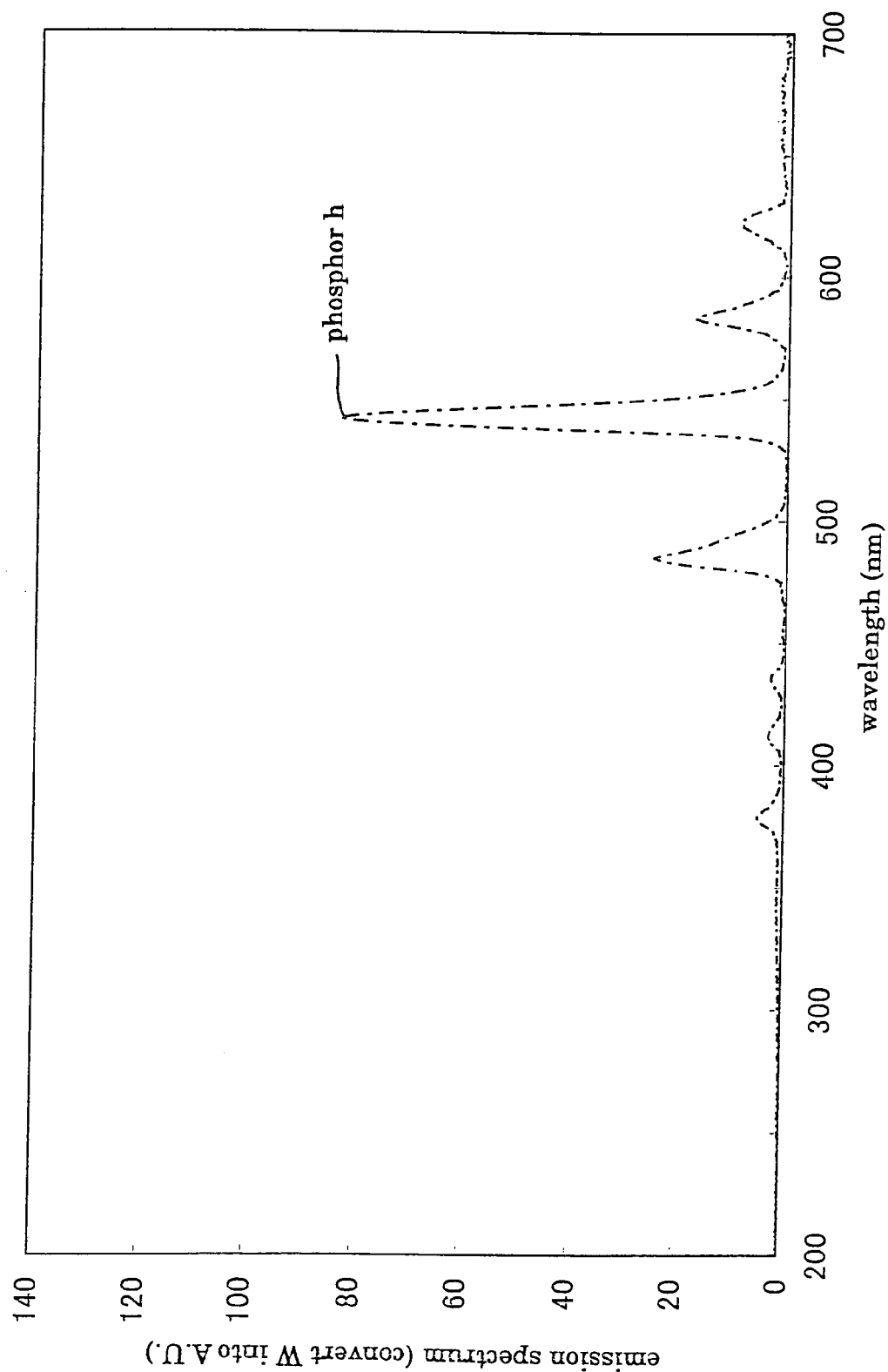
Figures 5, 8:
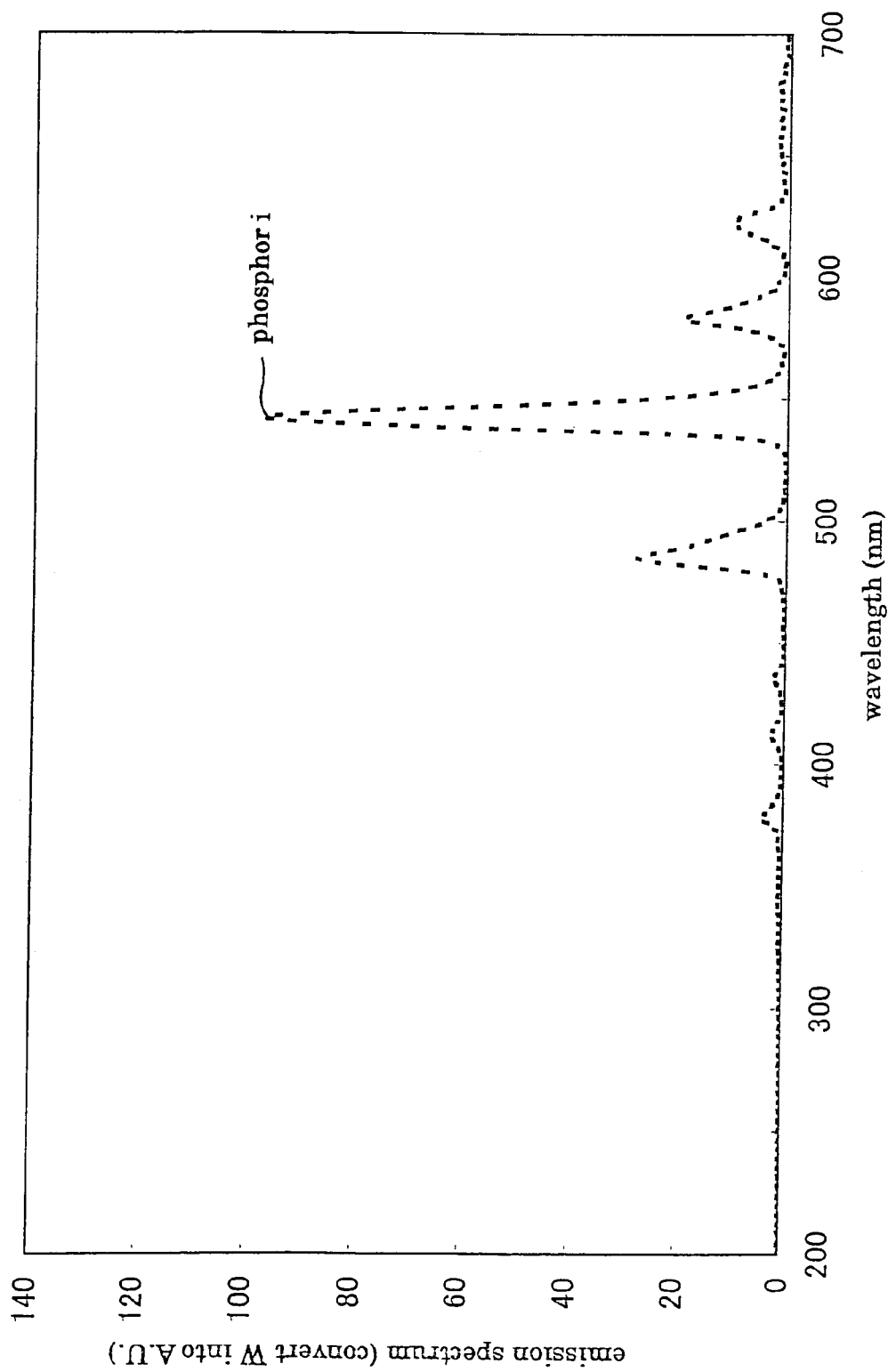
Figures 6, 8:
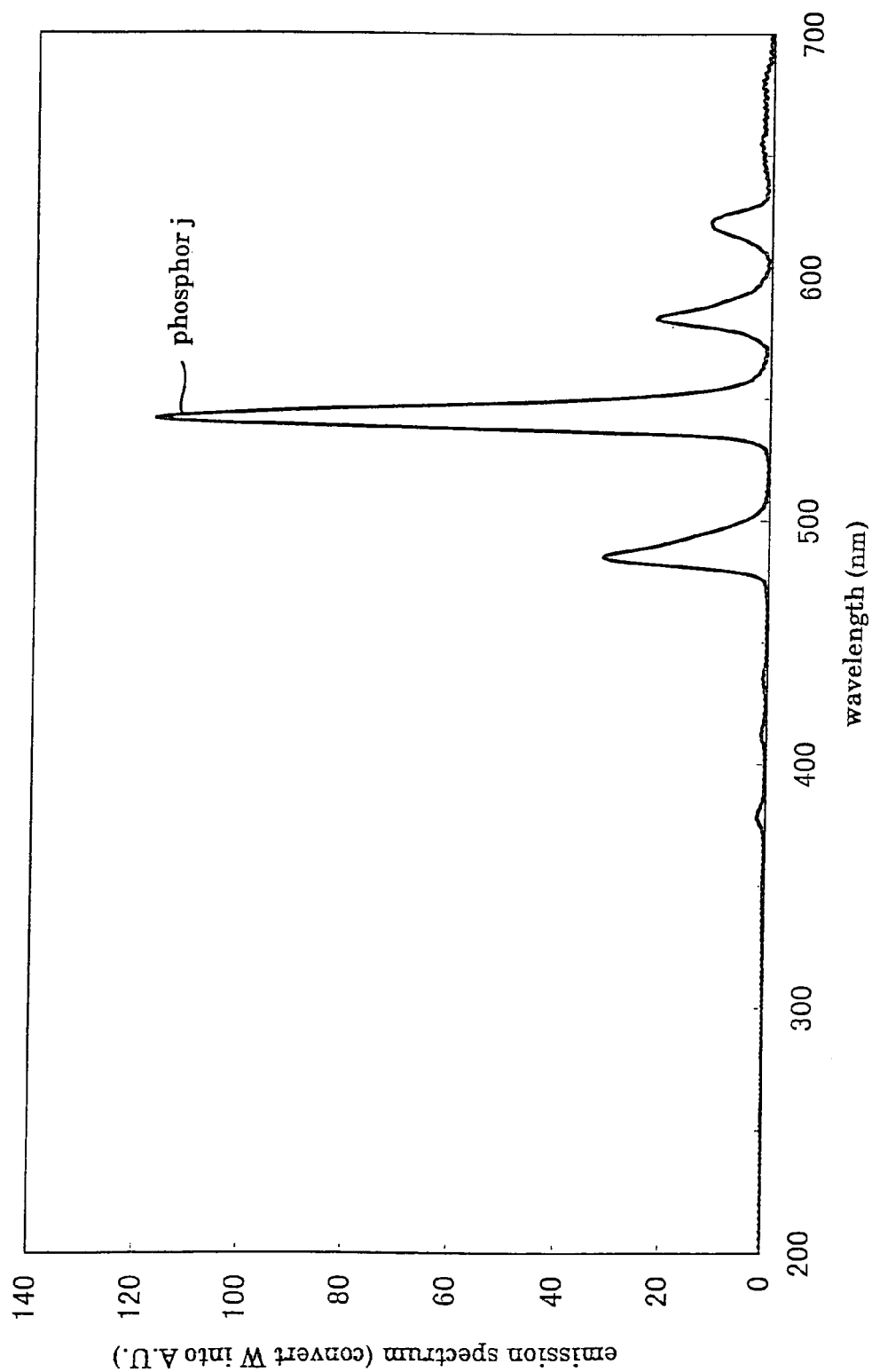
Figure 9:
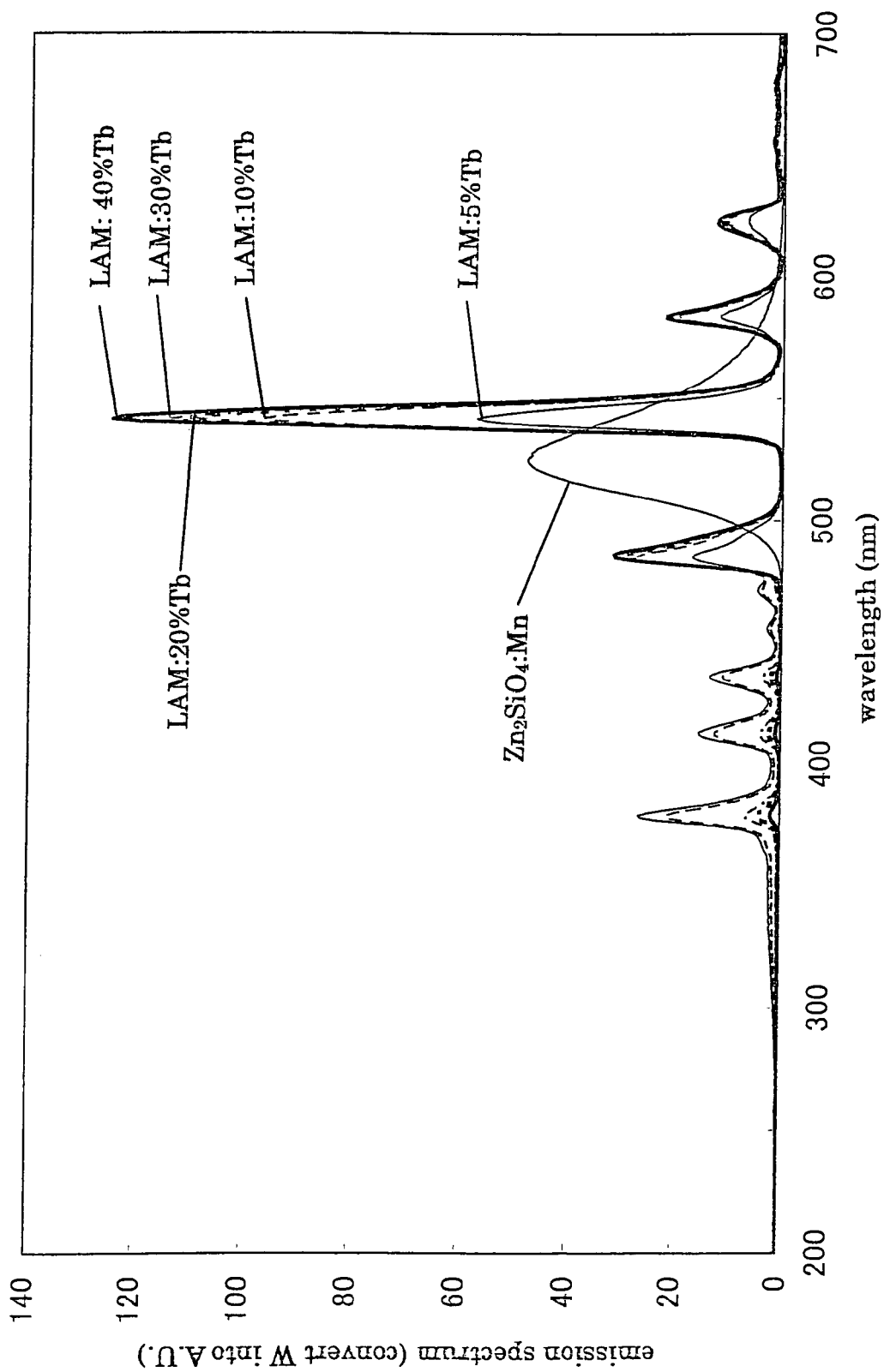
FIG. 9 illustrates emission spectra of phosphors LAM: MN,Tb in accordance with Example 3 of the present invention, and FIGS. 9-1, 9-2, 9-3, 9-4, 9-5 and 9-6 individually show the lines in FIG. 9.
Figures 1, 9:
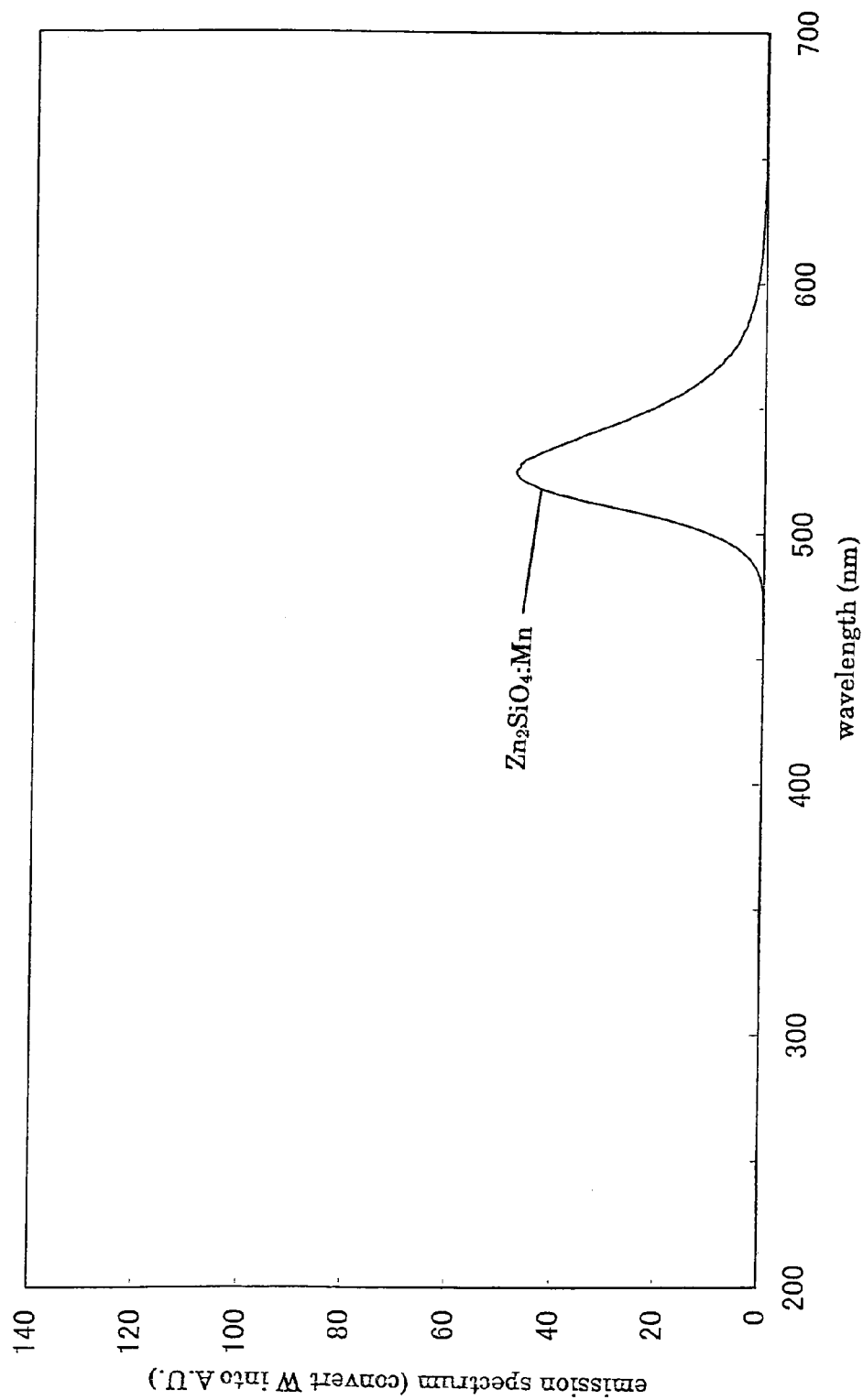
Figures 2, 9:
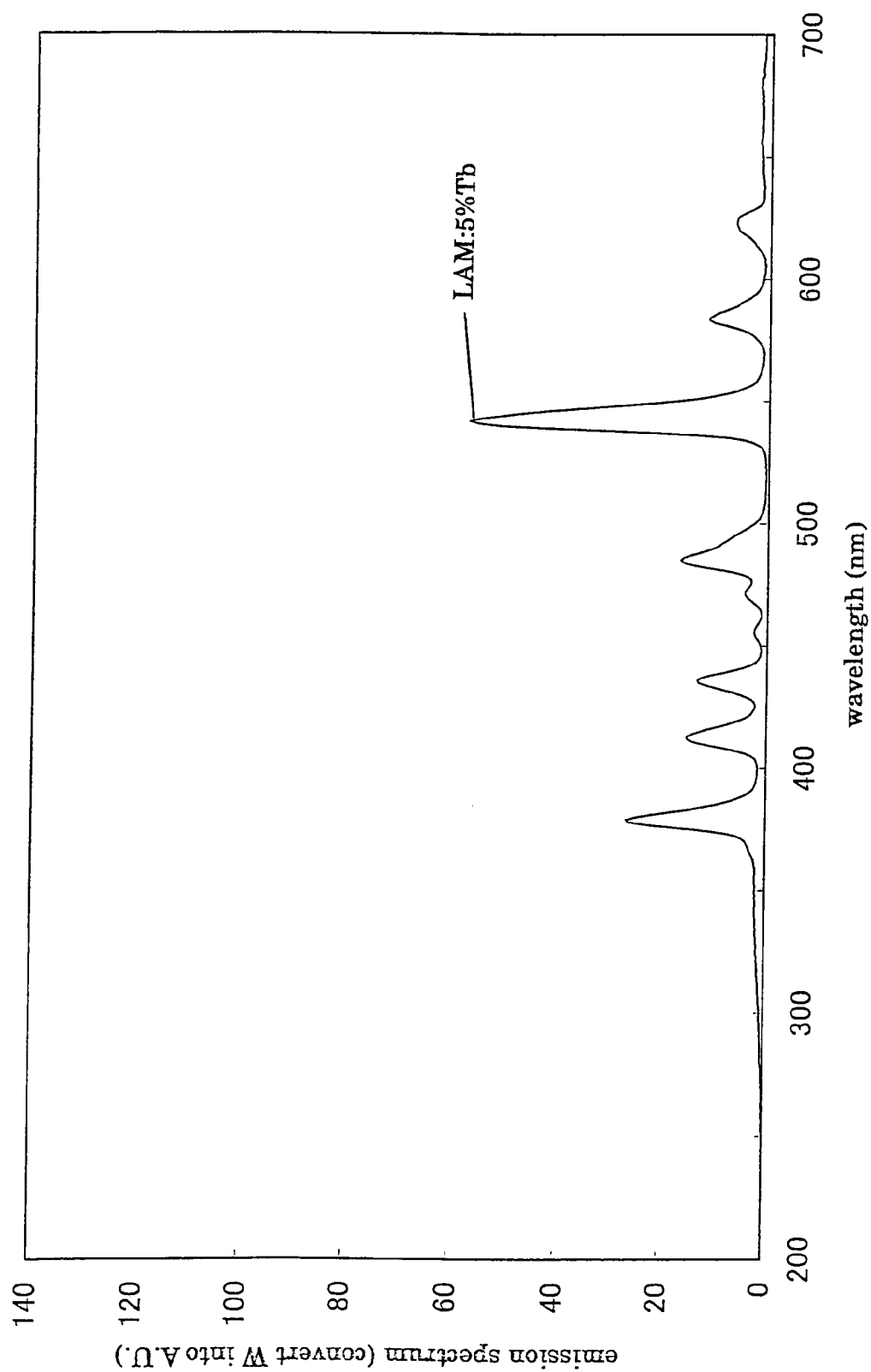
Figures 3, 9:
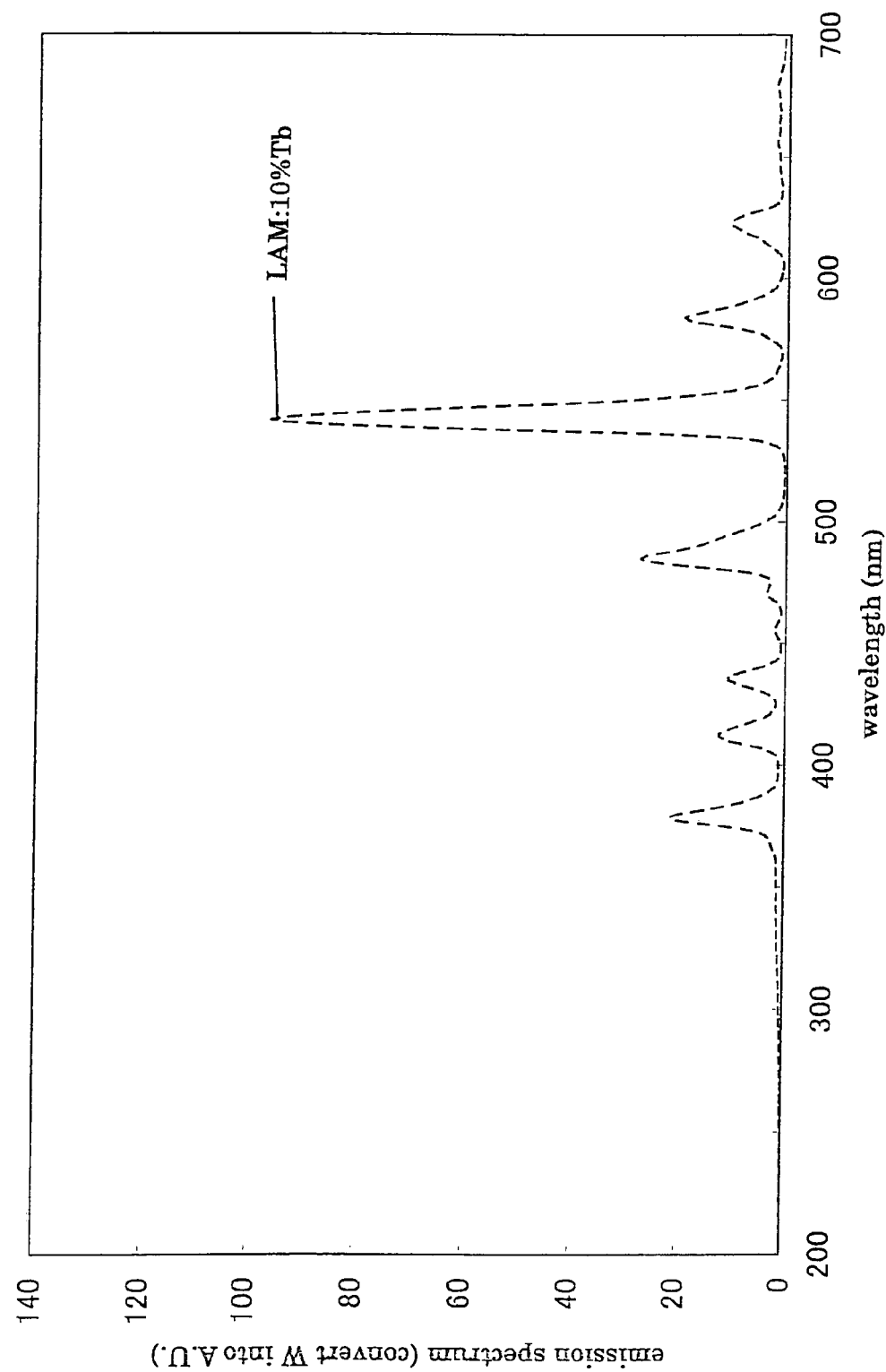
Figures 4, 9:
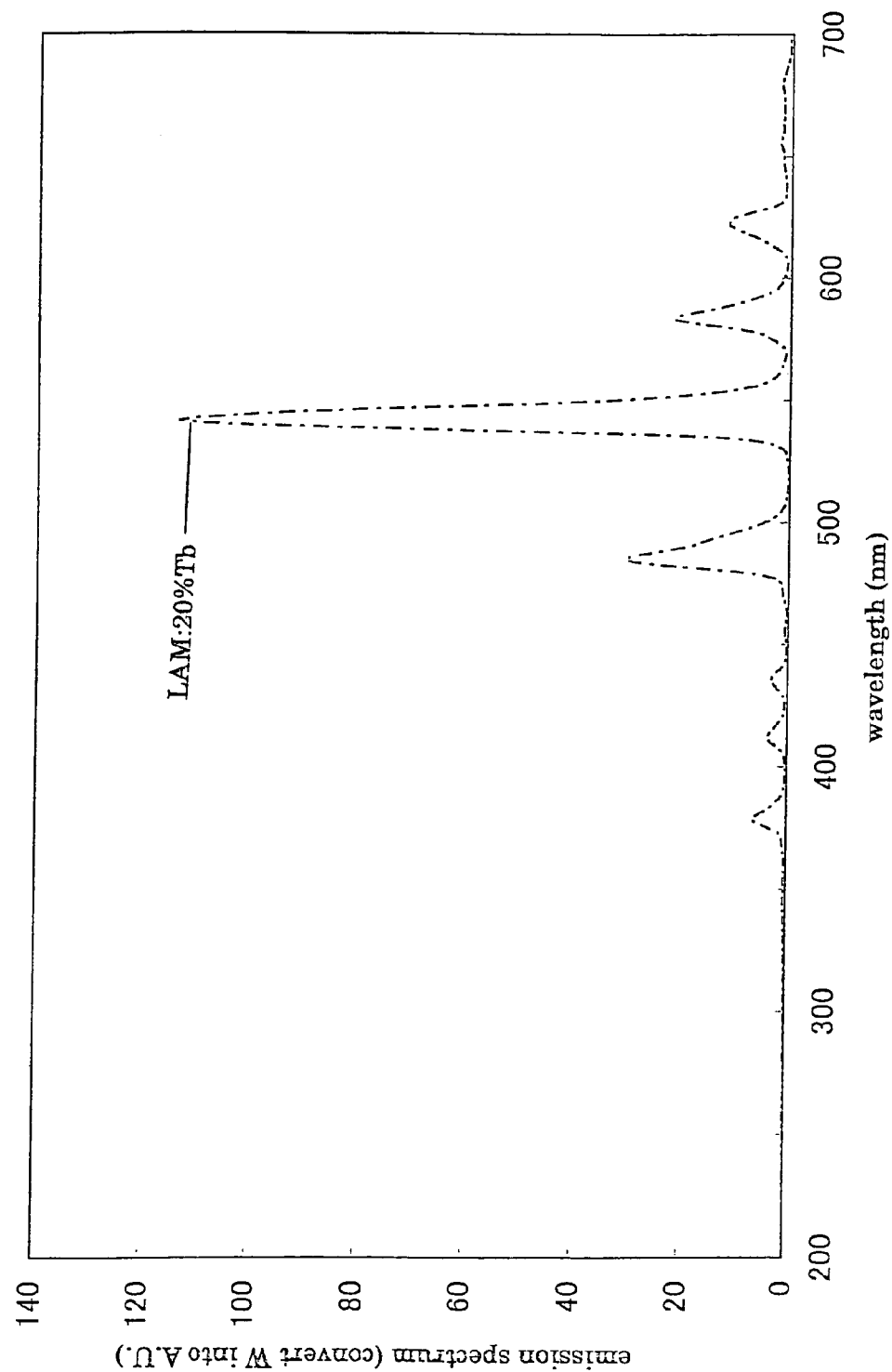
Figures 5, 9:
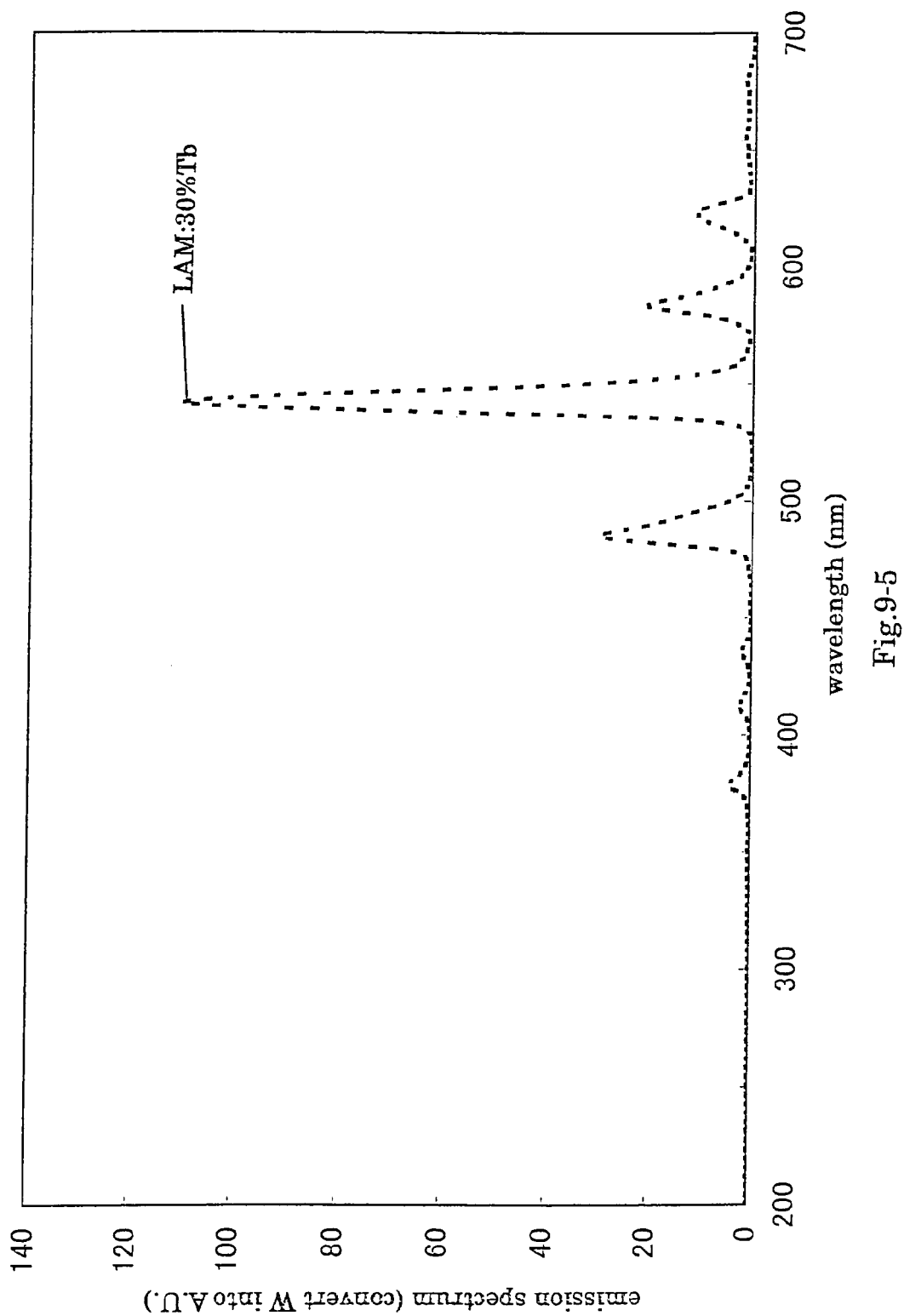
Figures 6, 9:
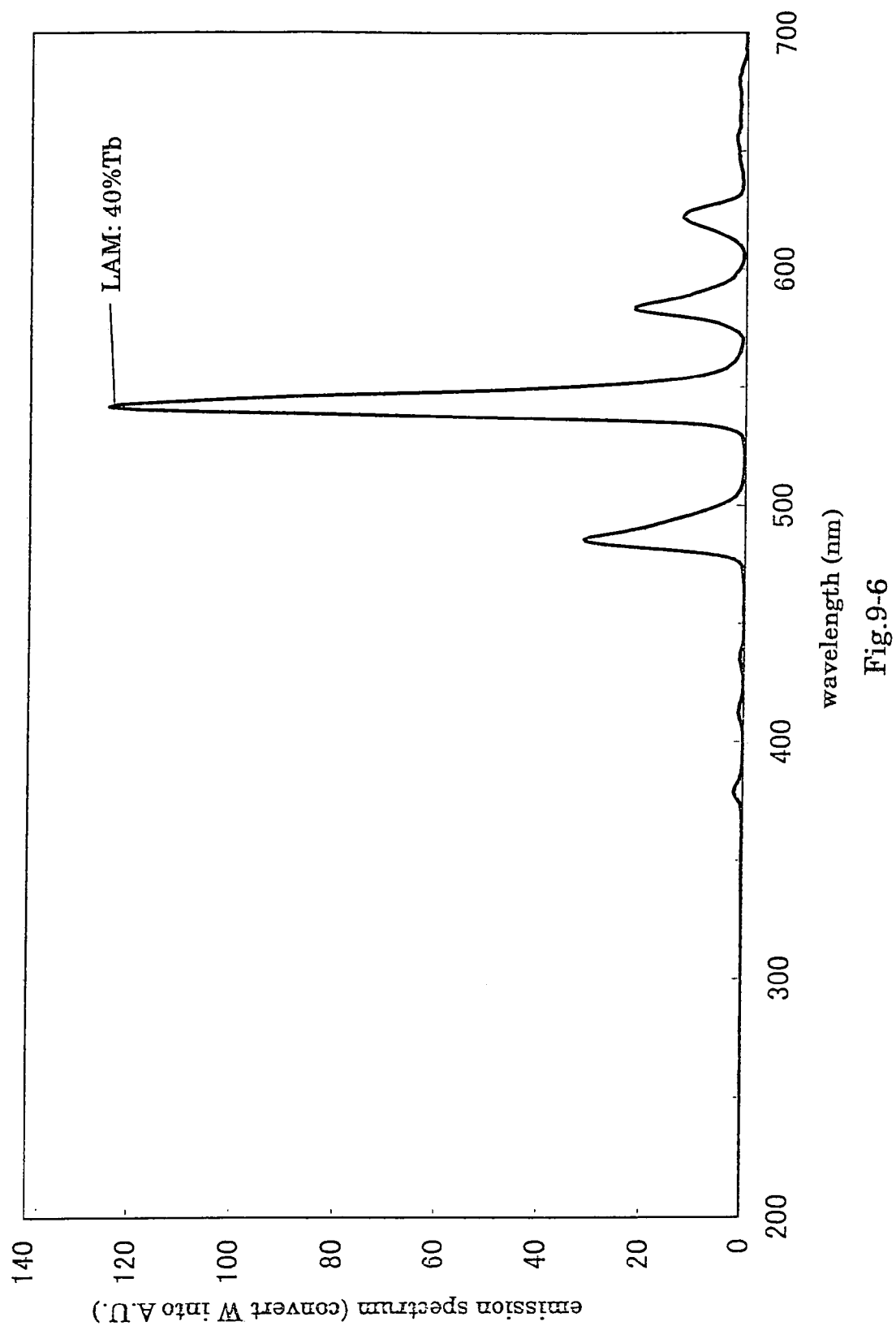
Figure 10:
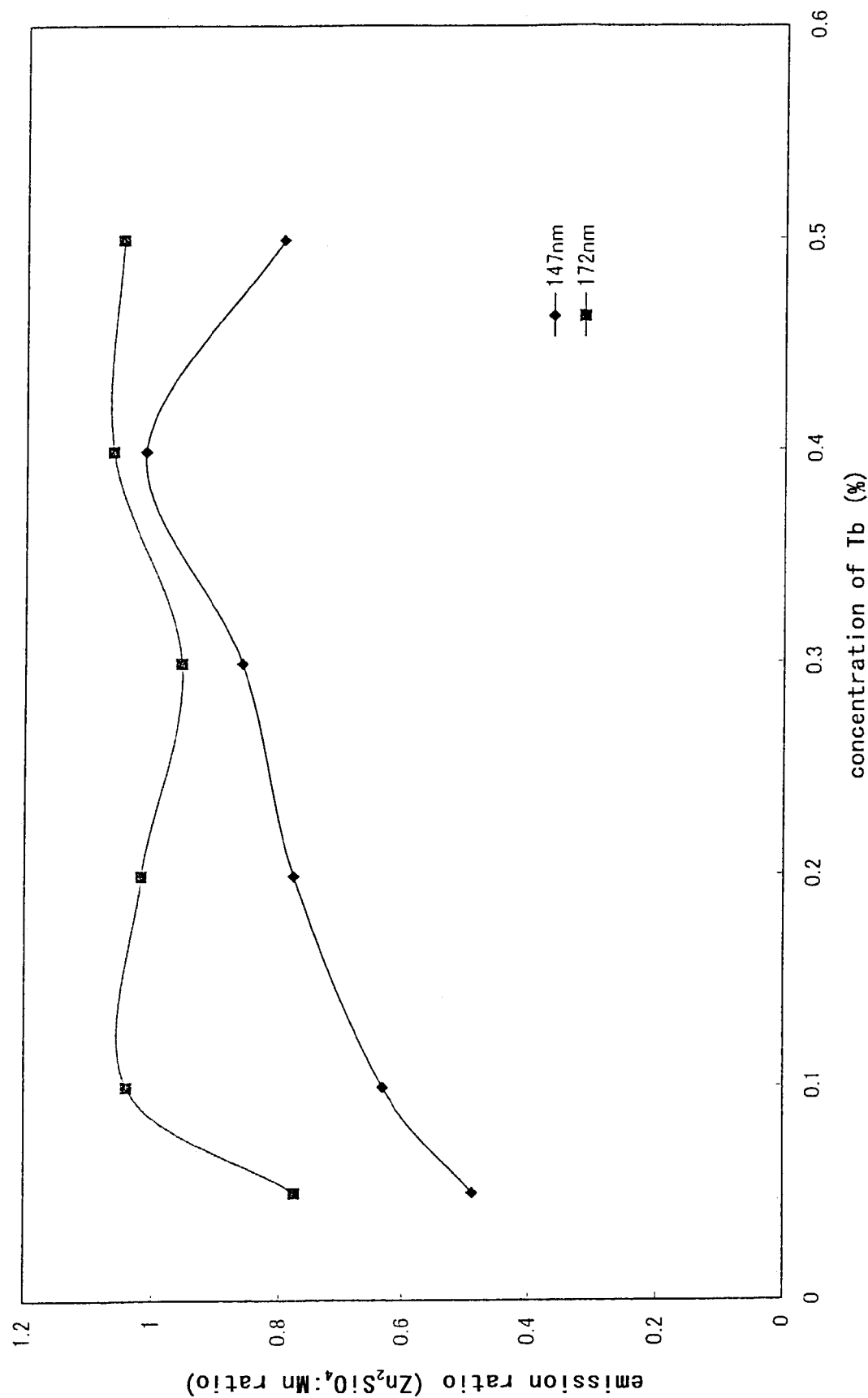
FIG. 10 is a graph showing a dependence of the luminance of phosphors of LAM:Mn, Tb of Example 3 upon the concentration of Tb.

The obtained phosphors "f" to "j" emitted green light upon being irradiated with light of 147 nm wavelength as shown in FIG. 8. The emission amount was almost equal to that of $Zn_2SiO_4$:Mn and larger than that of $CeMgAl_{11}O_{19}$:Tb and $LaMgAl_{11}O_{19}$:Ce, Tb by 20 to 30% or more. FIG. 9 shows light emission of phosphors "f" to "j" upon irradiation with light of 172 nm wavelength. The emission amount was almost equal to or over that of $Zn_2SiO_4$:Mn. FIG. 10 shows a change of the emission amount with a change of the concentration of Tb added.

A PDP was produced using the above phosphors in the same manner as in Example 1. A change of luminance with respect to the driving frequency was tested in the same manner as in Example 2 and found almost equal to $Zn_2SiO_4$:Mn. Further the phosphors were tested about a change of their luminance every time when the PDPs have been operated for given time periods in the same manner as in Example 2, and it was found that the luminance of the phosphors of Example 3 changed less than $Zn_2SiO_4$:Mn.

Example 4

Materials, with a suitable amount of ethanol added thereto, were mixed for three hours under the following conditions:

TABLE 4

| Materials | Phosphor "q" | Phosphor "r" |
|---|---|---|
| | Molar Ratio | |
| $Al_2O_3$ | 11 | 11 |
| MgO | 0.967 | 0 |
| $La_2O_3$ | 0.7 | 1 |
| $Tb_2O_3$ | 0.3 | 0 |
| $MnCO_3$ | 0.03 | 0.05 |
| ZnO | 0.003 | 0.95 |
| $MgF_2$ | 0.03 | 0.03 |

In the table, the molar ratio means the molar ratio of Al, Mg, La, Tb, Mn and Zn.

Figure 11:
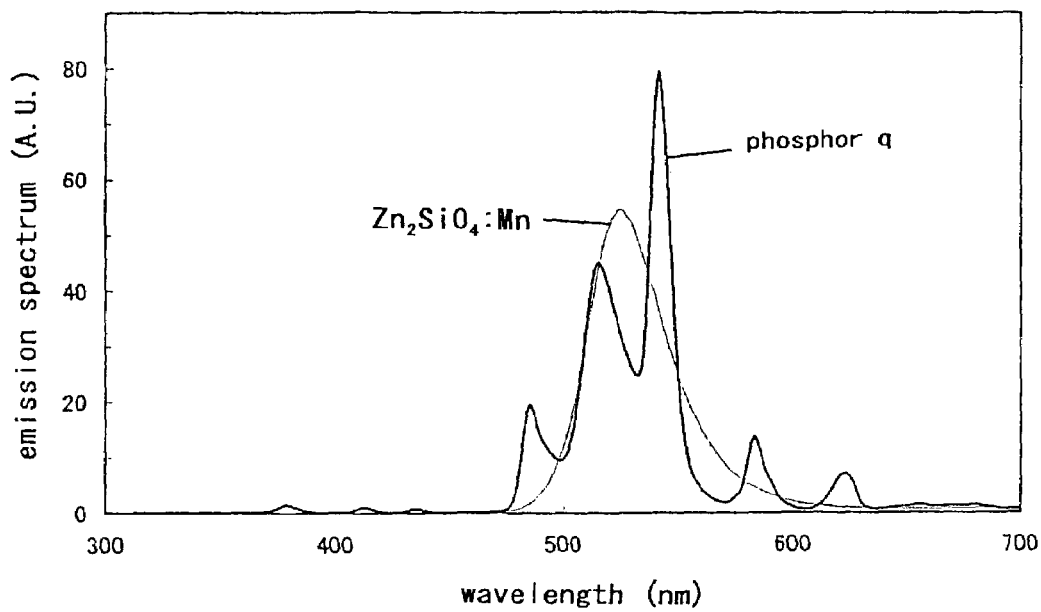
FIG. 11 illustrates an emission spectrum of a phosphor in accordance with Example 4 of the present invention.
Figure 12:
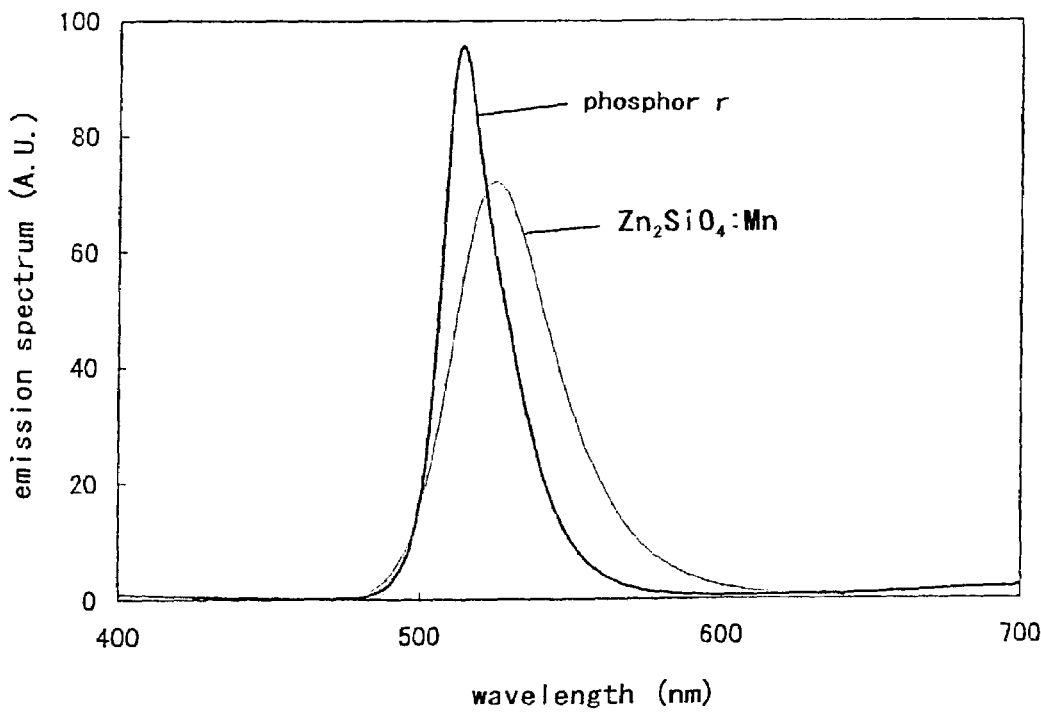
FIG. 12 illustrates an emission spectrum of a phosphor in accordance with Example 4 of the present invention.

The resulting mixtures were sintered at 1400° C. for four hours under nitrogen atmosphere and the obtained sinters were pulverized to give a phosphor "q" represented by $LaMgAl_{11}O_{19}$:Mn, Tb, Zn and a phosphor "r" represented by $LaZnAl_{11}O_{19}$:Mn. It was confirmed by the X-ray diffraction analysis that the obtained phosphors "q" and "r" had the magnetoplumbite-type crystal structure. The phosphors "q" and "r" emitted green light when they were irradiated with light of 147 nm wavelength. FIG. 11 and FIG. 12 illustrate emission spectra by light of 147 nm. The emission amount of the phosphor q was about 105% of that of $Zn_2SiO_4$:Mn, and the emission peak of the phosphor r was about 1.4 times higher than that of $Zn_2SiO_4$:Mn.

According to the present invention, it is possible to provide a green phosphor having excellent characteristics such as high color purity, good luminous efficiency, a long life and so on.

What is claimed is:

1. A green phosphor having a magnetoplumbite-type crystal structure, which contains at least Mn, La and Zn, wherein the green phosphor is excitable by vacuum ultraviolet radiation and is presented by the formula:

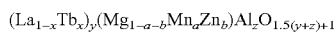

$(La_{1-x}Tb_x)_y(Mg_{1-a-b}Mn_aZn_b)Al_zO_{1.5(y+z)+1}$ wherein $0 \leq x \leq 0.5$, $0.8 \leq y \leq 1.2$, $0 < a+b \leq 1$, $8 \leq z \leq 30$.

2. A gas discharge device using a green phosphor having a magnetoplumbite-type crystal structure, which contains at least Mn, La and Tb.

3. A display device using a green phosphor having a magnetoplumbite-type crystal structure, which contains at least Mn, La and Tb.

4. A gas discharge device using a green phosphor having a magnetoplumbite-type crystal structure, which contains at least Tb and La but does not contain Ce.

5. A display device using a green phosphor having a magnetoplumbite-type crystal structure, which contains at least Tb and La but does not contain Ce.

6. A display device using a green phosphor having a magnetoplumbite-type crystal structure, which contains at least Mn, La and Zn.

7. A green phosphor having a magnetoplumbite-type crystal structure, comprising a host material of $LaMgAl_{11}O_{19}$ and a luminescence center element of at least Mn and Zn, wherein the green phosphor has a peak of an emission spectrum in the green color to excitation by vacuum ultraviolet radiation and is for use in a plasma display panel.

8. A plasma display panel comprising a green phosphor having a magnetoplumbite-type crystal structure, comprising a host material of $LaMgAl_{11}O_{19}$ and a luminescence center element of at least Mn and Tb, wherein the green phosphor has a peak of an emission spectrum in the green color to excitation by vacuum ultraviolet radiation.

9. A plasma display panel comprising a green phosphor having a magnetoplumbite-type crystal structure, comprising a host material of $LaMgAl_{11}O_{19}$ and a luminescence center element of at least Tb but does not contain Ce, wherein the green phosphor has a peak of an emission spectrum in the preen color to excitation by vacuum ultraviolet radiation.

10. A plasma display panel comprising a green phosphor as in claim 7.

* * * * *

UNITED STATES PATENT AND TRADEMARK OFFICE
CERTIFICATE OF CORRECTION

PATENT NO. : 7,037,445 B2 Page 1 of 1
APPLICATION NO. : 10/386664
DATED : May 2, 2006
INVENTOR(S) : Shinya Fukuta et al.

It is certified that error appears in the above-identified patent and that said Letters Patent is hereby corrected as shown below:

Col. 10, line 51, delete "preen" and insert --green--, therefor.

Signed and Sealed this

Eighth Day of August, 2006

JON W. DUDAS
*Director of the United States Patent and Trademark Office*